United States Patent
Ebuchi et al.

(10) Patent No.: US 9,244,634 B2
(45) Date of Patent: Jan. 26, 2016

(54) PRINT CONTROL APPARATUS AND CONTROL METHOD THEREOF

(75) Inventors: Kazuhisa Ebuchi, Yokohama (JP); Akiko Katano, Kawasaki (JP); Keiji Kawasaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 384 days.

(21) Appl. No.: 13/216,129

(22) Filed: Aug. 23, 2011

(65) Prior Publication Data

US 2012/0050803 A1    Mar. 1, 2012

(30) Foreign Application Priority Data

Aug. 31, 2010    (JP) .................................. 2010-195066

(51) Int. Cl.
G06F 3/12    (2006.01)

(52) U.S. Cl.
CPC ............ *G06F 3/1204* (2013.01); *G06F 3/1205* (2013.01); *G06F 3/1255* (2013.01); *G06F 3/1257* (2013.01); *G06F 3/1243* (2013.01)

(58) Field of Classification Search
CPC ... G06F 3/1255; G06F 3/1257; G06F 3/1205; G06F 3/1204
See application file for complete search history.

(56) References Cited

U.S. PATENT DOCUMENTS

| 8,400,680 B2 | 3/2013 | Kikuchi |
| 2002/0099783 A1* | 7/2002 | Mizuyama et al. ........... 709/208 |
| 2008/0316517 A1* | 12/2008 | Sato ............................ 358/1.13 |
| 2009/0201548 A1 | 8/2009 | Hirakawa |

FOREIGN PATENT DOCUMENTS

| JP | 9-190296 A | 7/1997 |
| JP | 2008-293381 A | 12/2008 |
| JP | 2009-188816 A | 8/2009 |
| JP | 2010-20578 A | 1/2010 |

OTHER PUBLICATIONS

U.S. Appl. No. 13/262,213, filed Oct. 21, 2011, Akiko Katano.
Fuji Xerox, DocuPrint C2220/2221, Manual Second Eddition, Fuji Xerox Document Product Company, Human Interface and Design Department, pp. 23-25, 63, 72, 85, 86 (Jan. 2002).

* cited by examiner

*Primary Examiner* — Barbara Reinier
*Assistant Examiner* — Lennin Rodriguezgonzalez
(74) *Attorney, Agent, or Firm* — Fitzpatrick, Cella, Harper & Scinto

(57) ABSTRACT

A print settings screen for instructing creation of form data is displayed as a screen provided by a printer driver. Further, when a form data creation instruction has been received, a screen showing a message indicating that an instruction to complete an operation is required on a print screen provided by an application is displayed in order to execute the instructed creation of form data. Stored, as a form file, is form data created by a creation instruction given on the print settings screen, after the instruction to complete the operation was given on the print screen provided by the application.

12 Claims, 29 Drawing Sheets

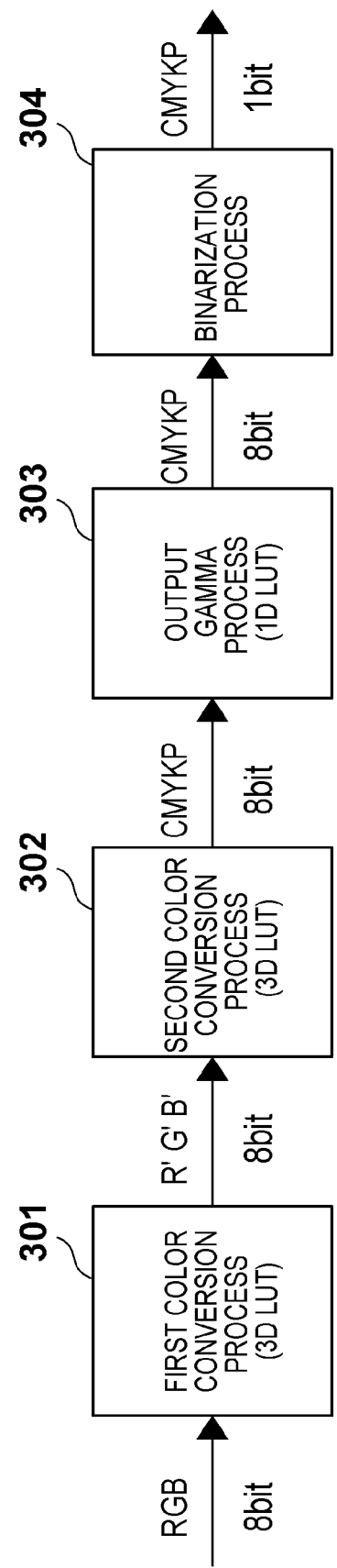

FIG. 4A

| PAPER TYPE | COLOR/ MONOCHROME | BORDERLESS PRINT | PRINT QUALITY | PRINT MODE NO. |
|---|---|---|---|---|
| PLAIN PAPER | COLOR | ON | NORMAL | 1 |
| | | OFF | NORMAL | 2 |
| | | ON | SPEED PRIORITY | 3 |
| | MONOCHROME | OFF | NORMAL | 4 |
| | | ON | NORMAL | 5 |
| | | OFF | SPEED PRIORITY | 6 |
| GLOSS PAPER A | COLOR | ON | QUALITY PRIORITY | 7 |
| | | OFF | NORMAL | 8 |
| | | ON | QUALITY PRIORITY | 9 |
| | MONOCHROME | OFF | NORMAL | 10 |
| | | ON | NORMAL | 11 |
| | | OFF | NORMAL | 12 |
| GLOSS PAPER B | COLOR | ON | QUALITY PRIORITY | 13 |
| | | OFF | NORMAL | 14 |
| | | ON | QUALITY PRIORITY | 15 |
| | MONOCHROME | OFF | NORMAL | 16 |
| | | ON | NORMAL | 17 |
| | | OFF | NORMAL | 18 |

| PAPER TYPE | COLOR/MONO-CHROME | BORDERLESS PRINT | PRINT QUALITY | AVAILABLE TRANSPARENT INK COATING METHOD | PRINT MODE NO. |
|---|---|---|---|---|---|
| PLAIN PAPER | COLOR | ON | NORMAL | AUTO | 1 |
| PLAIN PAPER | COLOR | OFF | NORMAL | AUTO | 2 |
| PLAIN PAPER | COLOR | ON | SPEED PRIORITY | AUTO | 3 |
| PLAIN PAPER | MONO-CHROME | ON | NORMAL | AUTO | 4 |
| PLAIN PAPER | MONO-CHROME | OFF | NORMAL | AUTO | 5 |
| PLAIN PAPER | MONO-CHROME | OFF | SPEED PRIORITY | AUTO | 6 |
| GLOSS PAPER A | COLOR | ON | QUALITY PRIORITY | AUTO, FULL, USER SETTING | 7 |
| GLOSS PAPER A | COLOR | ON | NORMAL | AUTO, FULL | 8 |
| GLOSS PAPER A | COLOR | OFF | QUALITY PRIORITY | AUTO, FULL, USER SETTING | 9 |
| GLOSS PAPER A | COLOR | OFF | NORMAL | AUTO, FULL | 10 |
| GLOSS PAPER A | MONO-CHROME | ON | NORMAL | AUTO, FULL, USER SETTING | 11 |
| GLOSS PAPER A | MONO-CHROME | OFF | NORMAL | AUTO, FULL, USER SETTING | 12 |
| GLOSS PAPER B | COLOR | ON | QUALITY PRIORITY | AUTO, FULL, USER SETTING | 13 |
| GLOSS PAPER B | COLOR | ON | NORMAL | AUTO, FULL, USER SETTING | 14 |
| GLOSS PAPER B | COLOR | OFF | QUALITY PRIORITY | AUTO, FULL, USER SETTING | 15 |
| GLOSS PAPER B | COLOR | OFF | NORMAL | AUTO, FULL, USER SETTING | 16 |
| GLOSS PAPER B | MONO-CHROME | ON | NORMAL | AUTO, FULL, USER SETTING | 17 |
| GLOSS PAPER B | MONO-CHROME | OFF | NORMAL | AUTO, FULL, USER SETTING | 18 |

F I G. 4B

F I G. 14A   TRANSPARENT INK NOT IMPARTED IN VICINITY OF WHITE DOTS
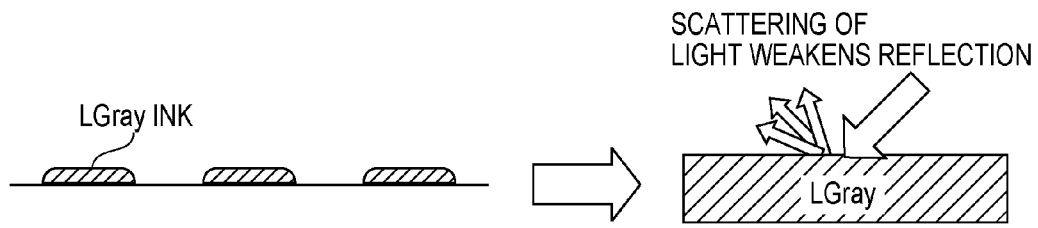
F I G. 14B   TRANSPARENT INK IS IMPARTED IN VICINITY OF WHITE DOTS
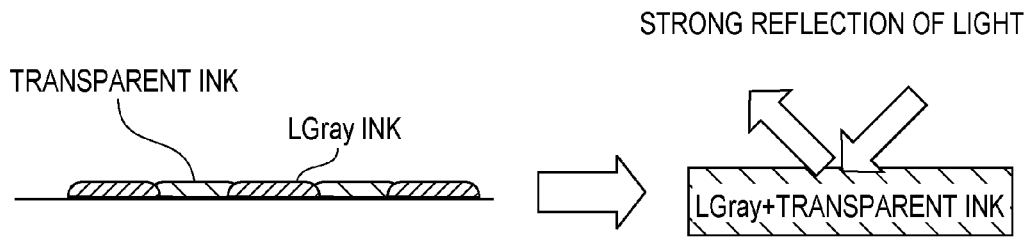
F I G. 14C   LGray ONLY
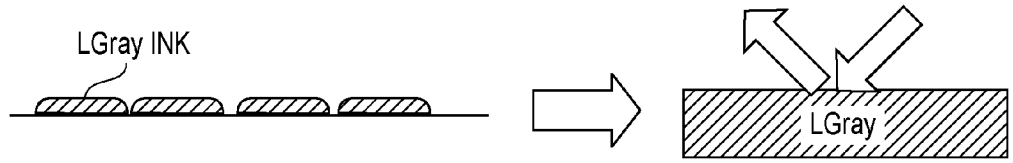
F I G. 14D   MIXTURE OF LGray AND Gray
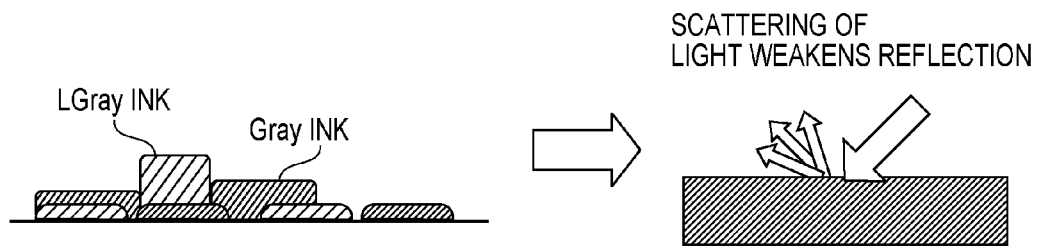

FIG. 18A

| FORM FILE LIST | | | | |
|---|---|---|---|---|
| FORM NAME | CREATED ON | PAPER SIZE | NUM OF PAGE | BORDERLESS PRINT |
| FORM 1 | 2010/08/30 | A1 | 1 | BORDER |

— 1801

— 1802

[ DELETE ] — 1803

FORM NAME

| FORM FILE LIST | | | | |
|---|---|---|---|---|
| FORM NAME | CREATED ON | PAPER SIZE | NUM OF PAGE | BORDERLESS PRINT |
| FORM 1 | 2010/08/30 | A1 | 1 | BORDER |

— 1801

— 1802

INVERT FORM   ● NO    ○ YES    ~ 1813

FORM APPLICATION  [ ALL PAGES THE SAME ▽ ] — 1814

PATTERN  [ ● ▽ ]  [ MEDIUM ▽ ] — 1816

1815

PRINT CONTROL APPARATUS AND CONTROL METHOD THEREOF

BACKGROUND OF THE INVENTION

1. Field of the Invention

The present invention relates to print control technology that uses form data for decorating printed material using a special color material such as transparent ink (clear ink).

2. Description of the Related Art

Conventionally, printers such as inkjet printers have performed printing using a special color material such as transparent ink, for example, in addition to the color inks cyan, magenta, yellow and black (CMYK) inks. In this case, an effect is typically obtained by applying inks to the entire printable area of the recording medium, although a certain effect can also be obtained by applying the transparent ink to only the image data.

Meanwhile, in the world of commercial printing, including offset printing and electro-photographic on-demand printing, the trend is increasingly towards decorating printed material using transparent ink and the like.

In view of this, technology for registering form data transmitted from an information processing apparatus in an image forming apparatus as image data onto which transparent toner is to be transferred, and combining registered form data with content data have been proposed (for example, see Japanese Patent Laid-Open No. 2009-188816). Here, additional information whose color is transparent is transmitted to the image forming apparatus as form data, together with a command indicating that this form data is additional information whose color is transparent.

In form combination printing, a configuration is typically adopted such that, when creating form data, the same operations as normal printing are performed with respect to the printing system, after having designated form data creation in the print settings for desired print data. Data designated for form data creation is registered in the printing system as form data as a result of the instruction given to print the data by this operation.

However, for the user, the operations for creating form data are different from the normal printing process, and the procedures and outcome of the operations are arguably extremely difficult to follow, since they do not culminate in paper output from the printing apparatus.

Also, even in the case where a combination printing instruction is actually given, it was not always possible to confirm whether the print format of the created form data matches that of the data with which the form data will be combined. Additionally, flexible print control using created form data has not been adequately provided, and improvement in operability is desired.

SUMMARY OF THE INVENTION

The present invention provides a technique that facilitates the operability of form combination printing by appropriately assisting procedures such as creation of form data and the actual execution of combination printing that are difficult for a user to follow.

According to one aspect of the present invention, there is provided a print control apparatus having a control unit that executes a printer driver for providing a form combination printing function and an application for instructing data targeted for combining to the printer driver, comprising: a display unit that displays a print settings screen, provided by the printer driver, for instructing creation of form data; and a storage unit that stores, as a form file, created form data whose creation was instructed on the print settings screen, wherein the display unit displays a screen, provided by the printer driver, showing a message indicating that an instruction to complete an operation is required on a print screen provided by the application, in order to execute creation of form data instructed using the print settings screen, and the storage unit stores, as a form file, form data created by a creation instruction given on the print settings screen, after the instruction to complete the operation was given on the print screen provided by the application.

Further features of the present invention will become apparent from the following description of exemplary embodiments (with reference to the attached drawings).

BRIEF DESCRIPTION OF THE DRAWINGS

FIG. 3 shows image processing when converting print data to a print command.

FIG. 4A shows a print mode table representing a dependency relation between setting items, and FIG. 4B shows a print mode table holding information relating to available transparent ink coating modes for each print mode.

FIGS. 14A to 14D show dot cross-sections and light reflection of imparted ink.

FIG. 18A shows an example screen of an area 506 when a form file creation mode is selected, and FIG. 18B shows an example screen of the area 506 when a form combining mode is selected.

DESCRIPTION OF THE EMBODIMENTS

Hereinafter, embodiments for implementing the invention will be described in detail with reference to the drawings. The following embodiments are not intended to limit the present invention, and not all combinations of features described in the embodiments are essential to the present invention.

Configuration of Printing System

First, the hardware configuration of a printing system in the present embodiment will be described using FIG. 1. In the present embodiment, a personal computer (PC) 1 is given as an example of a print control apparatus connected to a printing apparatus 2. An inkjet printer capable of using a special color material, such as transparent ink, for example, in addition to conventional color inks is given as an example of the printing apparatus 2.

Figure 1:
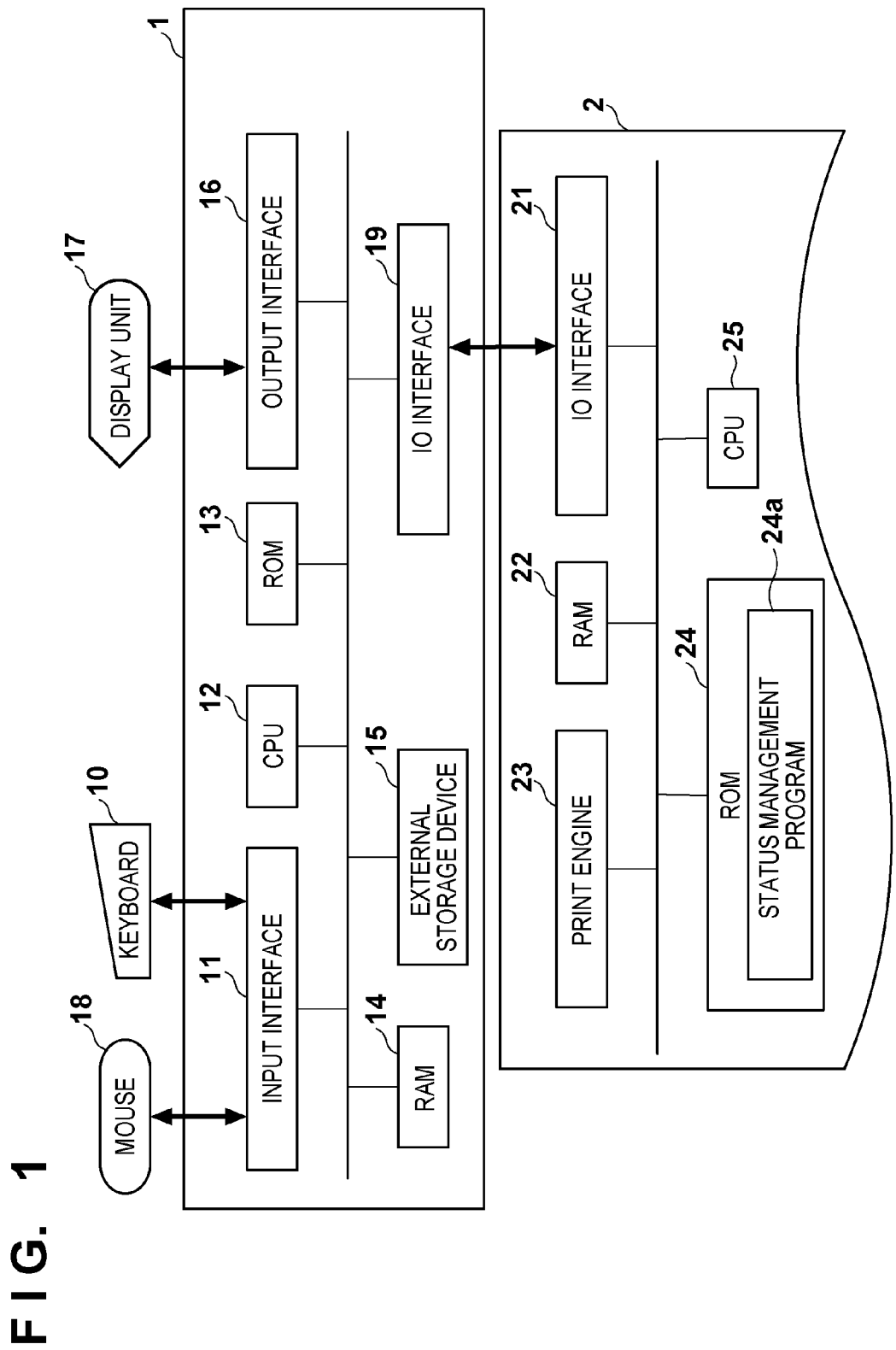
FIG. 1 shows a hardware configuration of a printing system in an embodiment of the present invention.

As shown in FIG. 1, the PC 1 has an input interface 11, a CPU 12, a ROM 13, a RAM 14, an external storage device 15, an output interface 16, a display unit 17, a keyboard 10, a mouse 18 and an input/output (IO) interface 19. In the ROM 13 is stored an initialization program and control data, and in the external storage device 15 is saved programs such as applications, an operating system (OS) and a printer driver, as well as various data. The RAM 14 is used as a work memory when the CPU 12 executes programs stored in the external storage device 15.

On the other hand, the printing apparatus 2 has an input/output (IO) interface 21, a RAM 22, a print engine 23, a ROM 24 and a CPU 25. Note that the printing apparatus 2 is connected to the IO interface 19 of the PC 1 via the IO interface 21. Note also that while the connection interfaces are assumed to be USB (Registered Trademark) interfaces in the present embodiment, other configurations are acceptable. Extension options for extending the functions of the printing apparatus 2 can also be connected to the IO interface 21.

The RAM 22 is used as a main memory and work memory of the CPU 25, and includes a reception buffer that initially saves print jobs received from the PC 1. Also, in the RAM 22 is saved drawing data generated from print jobs and various other data. The print engine 23 performs printing based on the drawing data saved in the RAM 22.

In the ROM 24 is stored a status management program 24a, various control programs and data used by the programs, and the CPU 25 controls the various constituent elements of the printing apparatus 2 in accordance with these programs. The status management program 24a is a program that monitors the status of the printing apparatus 2 in accordance with information from various sensors (not shown) provided in the printing apparatus 2, generates status information, and stores the generated status information in the RAM 22.

Note that the configuration of the PC 1 and the printing apparatus 2 and the allocation of processing thereto are not limited to the abovementioned configurations, and other configurations are acceptable if similar functions are provided.

Driver Module Configuration

Figure 2:
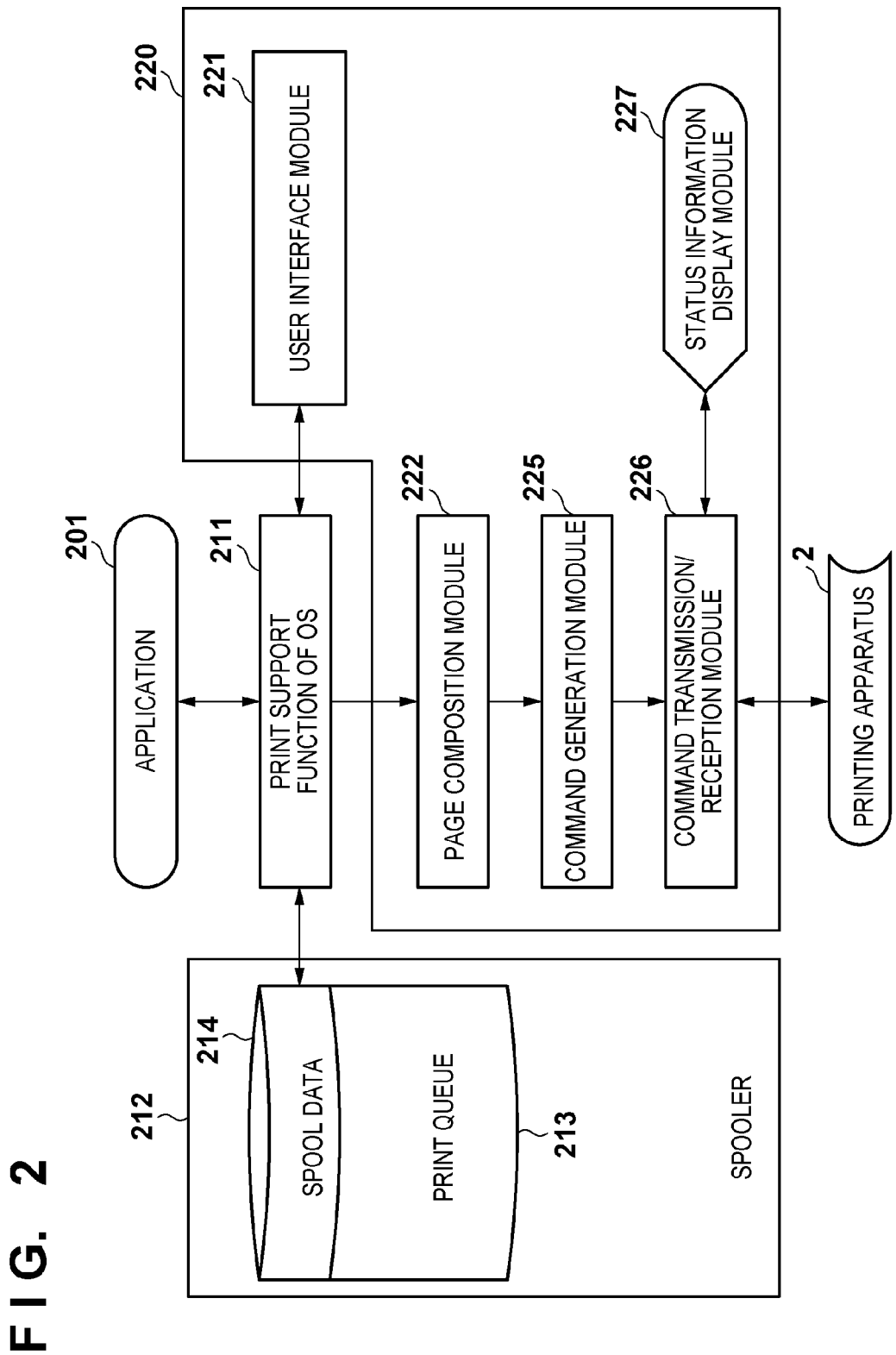
FIG. 2 is for describing the functions of a printer driver in the embodiment.

FIG. 2 is for describing the functions of a printer driver in the present embodiment. In the example shown in FIG. 2, the functions are conceptually represented focusing on a printer driver 220. Print data created by an application 201 is temporarily stored in a print queue 213 of a spooler 212 via a print support function 211 of the OS as spool data 214. The spool data 214 is managed by the spooler 212 as a print job to which a title and the like are attached. The spool data 214 is converted by the printer driver 220 to a command interpretable by the printing apparatus 2 and supplied to the printing apparatus 2.

The application 201 attaches, to the print job, print setting information received back from a user interface module 221 via the print support function 211 of the OS when giving a print instruction. Print setting information is information preset before a print start instruction is given from the application 201.

The user interface module 221 starts processing on receipt of a notification to start printing now from the print support function 211 of the OS. The user interface module 221 activates a status information display module 227 as a result of having received the print start notification from the print support function 211 of the OS.

Meanwhile, the print job delivered to the printer driver 220 undergoes processing by a page composition module 222 to rearrange the pages of the print job in accordance with the print setting information and to collate multiple pages into one page (page composition process). The print data of the print job is converted by a command generation module 225 to a print command that is interpretable by the printing apparatus 2 in accordance with the print setting information.

Next, the print command is sequentially transmitted to the printing apparatus 2 by a command transmission/reception module 226. Here, the command transmission/reception module 226 reads out the status of the printing apparatus 2, such as information indicating that an error has occurred in the printing apparatus 2 or information on the page currently being printed, and delivers status information to the status information display module 227.

Meanwhile, the status information display module 227 analyzes the status of the printing apparatus 2, and displays a status information display screen on the display unit 17 of the PC 1. The user is thereby able to check the status of the print job and the status of the printing apparatus 2.

Note that while, in the present embodiment, the status information display module 227 notifies information to the user by displaying a status information display screen, the present invention is not limited only thereto. For example, a configuration may be adopted in which the status information display module 227 performs status analysis of the printing apparatus 2 or the like, and the print support function 211 of the OS is used in processing for conveying information to the user using an information display screen. In the present embodiment, operating systems include a Microsoft Windows (Registered Trademark) operating system or the like, for example. Form combination printing using a typical printing operation in such an OS will be briefly described here, and discussed again later. First, form creation is set on a print settings screen of the printer driver, and the screen is closed by the user pressing an OK button or the like. The print instruction then needs to be completed by the user further pressing an OK button or the like on a print screen of the application that passed on the control from the printer driver. After this series of operations has been performed, form data will be created using a function provided by the printer driver.

With such form data creation operations, users often mistakenly believed that the form data creation process would be executed and completed simply by designating form data creation on the print settings screen and then closing this screen. In the present invention, a technique for being able to suppress the occurrence of such a misconception is provided. Also, in the present invention, a printing system that enables created form data to be used in a highly decorative printing process that uses a special color material (for example, transparent ink) is proposed.

Outline Description of Image Processing

Next, image processing when the command generation module 225 converts print data to a print command will be described using FIG. 3. Input red (R), green (G) and blue (B) 8-bit image data (256 gradations) is output as cyan (C), magenta (M), yellow (Y), black (K), and transparent ink (P) 1-bit bit image data.

Note that while an example using the four color inks C, M, Y and K is described here for the sake of simplicity, the present invention is not limited thereto. The present invention is also applicable to the case where 12 colors, for example, are used by adding intermediate color inks such as light magenta and light cyan, and further adding monotone inks such as light gray, gray, dark gray, photo black and matte black.

Also, the bit counts of input data and output data are not limited thereto. For example, RGB 16-bit image data can be input, and the output data can also be multi-bit data such as CMYK 2-bit (4 gradations) data.

As shown in FIG. 3, RGB 8-bit luminance data is input to a first color conversion process 301, and converted to R'G'B' 8-bit data using a three-dimensional (3D) lookup table (LUT). This color conversion process from RGB data to R'G'B' data involves correcting the difference between the color space of the input image represented by luminance data and the color space reproducible in the printing apparatus 2. This color conversion process also involves simultaneously performing a color space conversion process for converting the color space of the input image represented by RGB luminance data to a device-independent XYZ color space and processing for converting this device-independent color space to a color space dependent on the printing apparatus 2.

In FIG. 3, a result of the first color conversion process 301 is represented as a signal R'G'B'. Also, while processing is performed using a 3D LUT in the first color conversion process 301, grid points are not required for all input combinations, and combining this processing with an interpolation processing is performed similarly to known technology.

Next, the R'G'B' 8-bit data resulting from the first color conversion process 301 is input to a downstream second color conversion process 302, and converted to CMYKP 8-bit data using a 3D LUT. This process involves processing for color converting input RGB data represented with a luminance signal to output CMYK data for representing the input RGB data with a density signal, and processing such as masking, under color removal and black generation.

Note that with the 3D LUT of the second color conversion process 302, similarly to the 3D LUT of the first color conversion process 301, only data for points at prescribed intervals among the point in three-dimensional space is provided, and conversion of the 8-bit data of points other than the points at prescribed intervals is performed using an interpolation processing.

Next, the CMYKP 8-bit data obtained by the second color conversion process 302 is input to an output gamma process 303, and undergoes γ-correction using a one-dimensional (1D) LUT for each color. This processing is performed given that the dots recorded per unit area of the printing medium and output characteristics such as reflected density obtained by measuring these dots normally do not form a linear function. Accordingly, this output gamma process 303 enables a linear function between the input gradation level of the CMYKP 8-bit data and the density level of the recorded image to be ensured.

After this output gamma process 303, a binarization process 304 is performed. Because the printing apparatus 2 of the present embodiment is a binary printing apparatus, the CMYKP 8-bit data obtained as described above is quantized to CMYKP 1-bit data.

Note that the abovementioned image processing (color conversion, output gamma process, binarization process) involves processing that differs depending on the content of the print settings. The appropriate image processing differs depending on the type of printing media used, and, further, image processing suitable for a mode that prioritizes image quality over print speed and image processing suitable for a mode that prioritizes print speed over image quality also differ depending the print quality setting.

In the present embodiment, the processing content of the abovementioned image processing changes depending on the combination of respective setting values for "Paper Type", "Print Quality", "Color/Monochrome" and "Borderless Print" among the print setting items. Here, "Paper Type" is an item designating the type of printing media, and "Print Quality" is an item designating quality priority mode or speed priority mode. "Color/Monochrome" is an item designating color printing or monochrome printing, and "Borderless Print" is an item designating borderless printing.

Specifically, image processing is optimized for the print settings by changing the 3D LUTs used by the first color conversion process 301 and the second color conversion process 302 and the 1D LUT used by the output gamma process 303. Image processing is also optimized for the print settings by changing the binarization method (dither matrix method, error diffusion, etc.) applied and the matrix and parameters used in the binarization process.

Description of Print Modes and Menu Links (Description of Mismatch Processing)

With the print settings, there is a dependency relation between the setting items. For example, the level of print quality provided differs depending on the paper type setting value. More specifically, the level of print quality provided is determined by the paper type setting value, the color/monochrome setting value and the borderless print setting value. FIG. 4A shows an example of a print mode table representing the dependency relation between the setting items. In this print mode table, the priority of the setting item on the left is higher, and the setting item on the right is influenced by the setting values of setting items on the left.

That is, the selectable color/monochrome setting value is determined by the setting value for paper type. The selectable borderless print setting value is determined by the setting values for paper type and color/monochrome. The selectable print quality is determined by the setting values for paper type, color/monochrome, and borderless print. For example, normal and speed priority are selectable in a state where plain paper, color and borderless print off are set, whereas only normal is selectable in a state where plain paper, color and borderless print on are set. This is because there are cases where a printing method such as applying ink to run outside of the dimensions of the printing media as with borderless printing is not preferable depending on the material of the printing media. Given that highly accurate print control is required in the case where borderless printing is performed since ink is applied beyond the dimensions of the printing media, controls such as restrictions on selectable print quality are determined based on factors such as the structure of the printing apparatus and the material of the printing media.

Since the method of image processing and print control is thus determined by setting values from the high-level setting item "Paper Type" through to low-level setting item "Print Quality", the individual combinations of these setting values will be called print modes in the present embodiment. The field "Print Mode No." in the print mode table shown in FIG. 4A is a number specifying the print mode. While the image processing method was described above as changing depending on the print settings, the image processing method specifically changes for every print mode.

Figure 5:
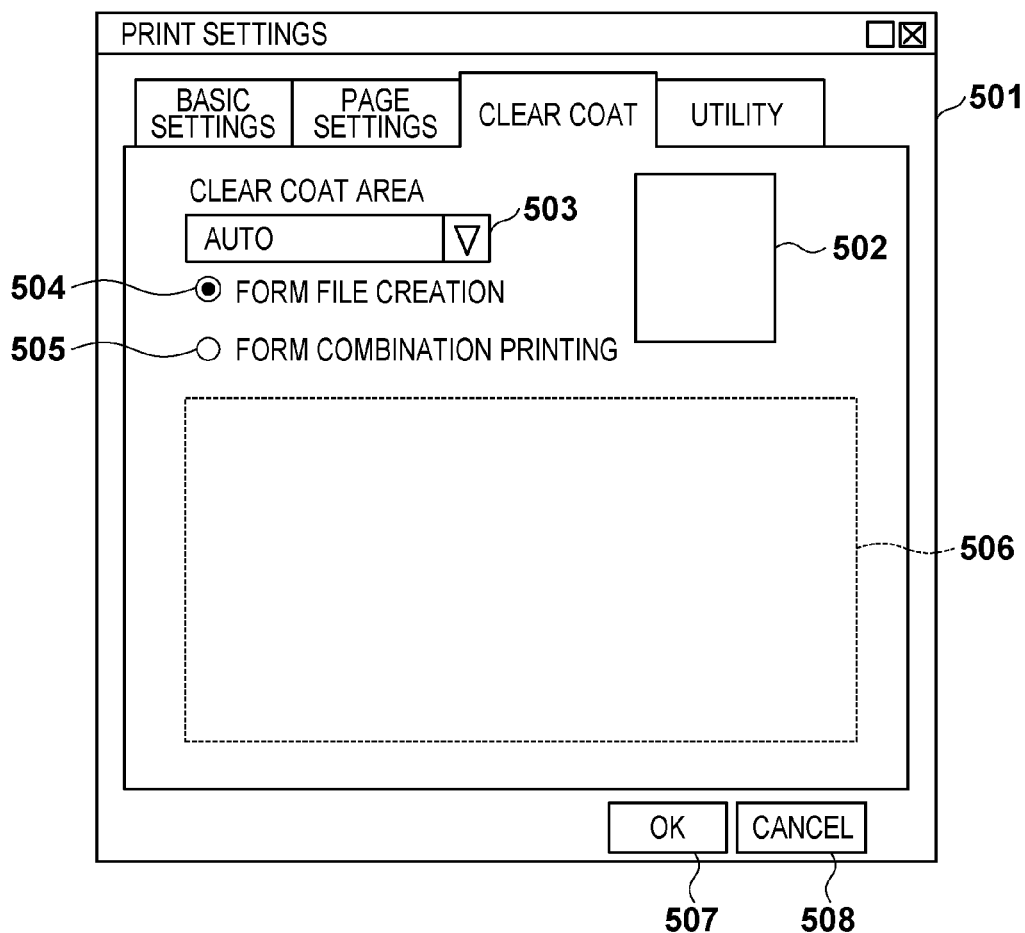
FIG. 5 shows an example of a print settings screen in the embodiment.
Figure 6:
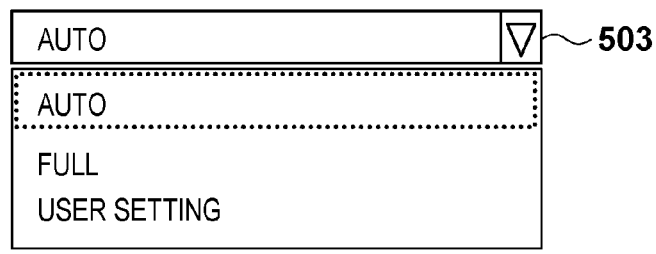
FIG. 6 shows a pull-down menu for the transparent ink coating modes.

Description of Processing Content of UI and Modes and Processing-related Content FIG. 5 shows an example of a print settings screen displayed by the user interface module 221 of the printer driver 220. This screen is displayed when a "Property" button invoking the printer driver is pressed on a print screen provided by the application. Using a print settings screen 501 enables the user to configure advanced settings for various items such as the paper type used, paper size, feed method, and print quality. The print settings screen 501 includes an "OK" button 507 and a "Cancel" button 508. A pull-down menu 503 is for selecting a "transparent ink coating mode" for deciding the appropriate transparent ink coating mode. This pull-down menu 503 displays a list of transparent ink coating modes provided by the printer driver 220, and a transparent ink coating mode is set by the user selecting an arbitrary transparent ink coating mode. These transparent ink coating modes consist of the three modes "Auto", "Full" and "User Setting" as shown in FIG. 6, and the user is able to designate a transparent ink coating method by selecting an arbitrary mode from this pull-down menu 503. Note that "Auto" is selected as the default transparent ink coating mode. The processing performed in these transparent ink coating modes is as follows.

The coating mode "Full" (full-surface coating mode) is a mode for applying transparent ink to the entire print area of the printing media. Note that transparent ink is known to be more effective with some media than others. That is, transparent ink is not very effective when applied to plain paper or matte-coated paper, but with paper such as gloss paper having a glossy finish, applying transparent ink is known to achieve a uniform glossiness and expand the color gamut.

In view of this, in the coating mode "Auto" (automatic coating mode), transparent ink is not applied in the case of media with respect to which coating of transparent ink is not highly effective, and transparent ink is applied to portions of the print data other than areas of white dots in the case of media with respect to which coating of transparent ink is effective. That is, in this automatic coating mode, whether or not to apply transparent ink depends on the setting value of paper type in the job settings.

Note that while, in the present embodiment, transparent ink is not applied to media with respect to which transparent ink is not highly effective, transparent ink can be applied not only gloss paper but also to media such as plain paper depending on the combination of transparent ink and media used. Also, the amount of transparent ink applied may be varied depending on the media such as plain paper or gloss paper.

As described with FIG. 2, in the present embodiment, print data created by the application 201 is temporarily stored as spool data 214 via the print support function 211 of the OS. The spool data 214 is then converted by the printer driver 220 to a print command interpretable by the printing apparatus 2.

Here, depending on the type of OS, a function that allows a received print command to correctly deliver the position coordinates of image data may not be provided. Thus, the automatic coating mode is a partial coating mode for applying transparent ink to portions of the print data other than the areas of white dots.

Further, in the case of the automatic coating mode, since it is judged whether to apply transparent ink depending on the setting value for paper type in the job settings, as mentioned above, the user does not have to make complex judgments, leading to improvements in operability.

Next, the coating mode "User Setting" (user setting mode) is a mode for changing the appearance and imparting a design sense to printed material by not applying ink to part of the print data, and has a form file creation mode and a form combination printing mode.

In the form file creation mode, an area in which transparent ink is not to be applied (transparent ink elimination area) is created and saved as a form file in the PC 1. In the form combination printing mode, printing is performed with transparent ink being applied in all areas except the area designated by the transparent ink elimination area included in a selected form file. Note that the form combination printing mode will be discussed in detail later.

Description of Ink Coating Process in Auto and Full-surface Coating Modes

Figure 13A:
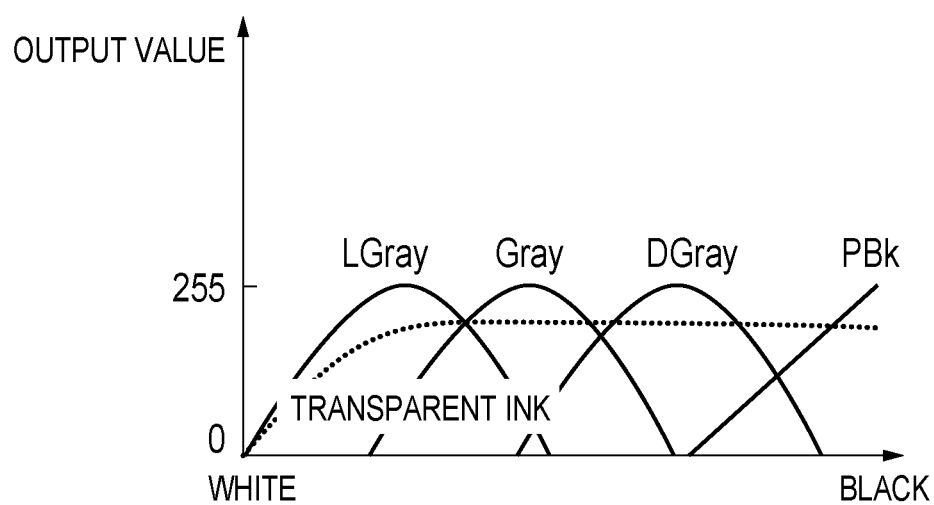
FIG. 13A shows output values for color ink and transparent ink in an automatic coating mode.
Figure 13B:
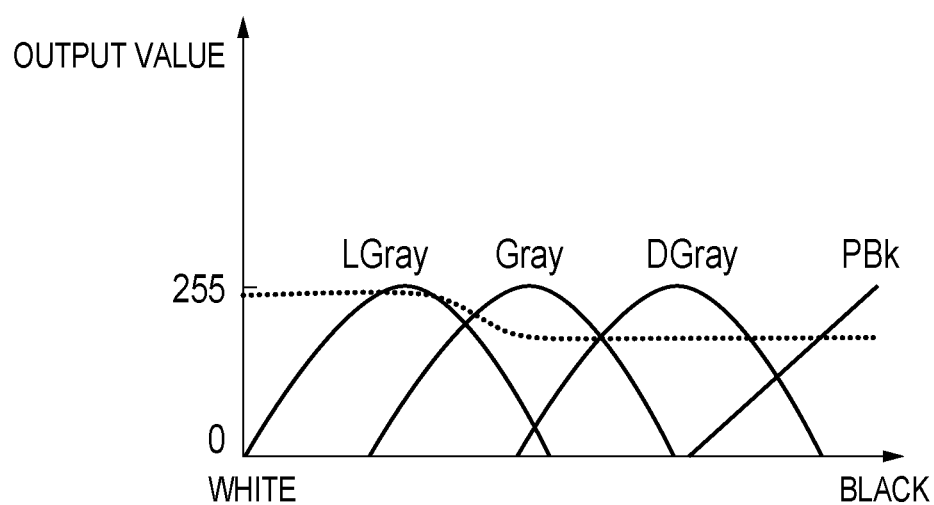
FIG. 13B shows output values for color ink and transparent ink in a full-surface coating mode.

Here, the value of the transparent ink output signal in the case where gloss paper A or B is selected in the full-surface coating mode or the automatic coating mode will be discussed in detail. FIGS. 13A and 13B represent the change in the output value of transparent ink determined by the second color conversion process 302.

FIG. 13A represent the change in the output values of color ink and transparent ink in the automatic coating mode, and FIG. 13B represent the change in the output values of color ink and transparent ink in the full-surface coating mode. For the sake of simplicity, color separation of color inks into the four colors CMYK has been described up to this point, but the present invention is also applicable to the case where 12 colors, for example, are used by further adding inks of intermediate colors.

Typically, in the case where monotone inks such as light gray, gray, dark gray, photo black and matte black are further added, smoother transition of the monotone portions from white to black can be represented. FIGS. 13A and 13B are graphs in which the portion (hereinafter, gray line) from a white dot $R=G=B=255$ to a black dot $R=G=B=0$ has been extracted with a LUT for 12 color inks.

According to these graphs, only light gray (LGray) ink is printed from the white dot $R=G=B=255$ to a grid point $R=G=B=240$. Gray (Gray) ink start from $R=G=B=240$, and LGray ink peaks in the vicinity of $R=G=B=215$ and declines thereafter. Further, dark gray (DGray) starts from $R=G=B=120$, and Gray ink peaks and declines thereafter. Black (hereinafter, PBk) starts from $R=G=B=64$, with DGray ink peaking and declining thereafter, and only PBk ink remains at the final $R=G=B=0$. Note that while other color lines are typically further combined with the gray line in order to match colors, such a configuration is omitted in this example.

In the full-surface coating mode, printing is performed on the all of the printable region of the printing media, such that a difference in gloss does not arise at the boundary between the white background of the printing media and the printed portion. As shown in FIG. 13B, control is performed to output a larger amount of transparent ink at densities where mainly LGray ink is output as a single color from $R=G=B=255$ to the vicinity of $R=G=B=215$. The reason for this will be explained below.

Typically, when pigment ink is applied on gloss paper, which is paper having a glossy finish, pigment particles remain on the surface of the gloss paper in comparison with dye ink. Thus, the gloss of the pigment particles themselves is noticeable in portions where pigment is liberally used, and the reflection of light is stronger in these portions only.

This reflection of light will be described in detail using FIGS. 14A to 14D. As is apparent from FIGS. 13A and 13B, the output value of LGray in the portion near a white dot is low. In this case, a dot cross-sectional image per unit area reveals that there are portions imparted with LGray and portions where the surface of the printing media is exposed, as shown in FIG. 14A.

Normally, if not printing media such as film, the reflection of light from the gloss paper itself will be less than the reflection of light when covered in pigment ink. Therefore, there will be less reflection of light the larger the exposed portion of the surface of the printing medium. In this case, irregularity is created on the image surface between the parts where LGray is imparted and the parts where LGray is not imparted. At this time, the reflection of light is reduced, since the light is scattered by the irregularity on the image surface, as shown by the image of light reflection in FIG. 14A (open arrows in the diagram are intended to represent light).

Therefore, when the gaps that arise in the vicinity of the white dots are filled in with a large amount of transparent ink, the irregularity on the surface is reduced, and scattering of light is suppressed as shown in FIG. 14B. That is, here, increasing the reflection of light enables a uniform glossy feel with portions where other color inks are applied to be imparted.

Also, because the irregularity on the image surface is reduced in the case where the paper is substantially filled in with the single color LGray ink, as shown in FIG. 14C, the reflection of light by the pigment particles themselves tends to be stronger at $R=G=B=215$, where the output value of LGray ink is near it maximum. Accordingly, a large amount of transparent ink is needed to cover the pigment particles and impart a uniform gloss.

On the other hand, as shown in FIG. 14D, at portions where LGray and Gray inks are used at the same time, the LGray and Gray inks are randomly printed between a plurality of paths, giving rise to irregularity on the image surface. Scattering of light thus occurs, and the reflection of light by the pigment particles themselves is comparatively weaker than the case where a single color is printed. In other words, the amount of transparent ink applied can be reduced in high density areas closely approaching black where a plurality of ink are used at the same time. The above is summarized below.

Figure 22A:
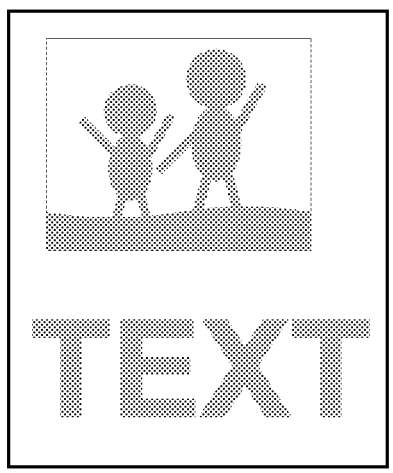
FIGS. 22A to 22D show printing media on which transparent ink has been applied.
Figure 22B:
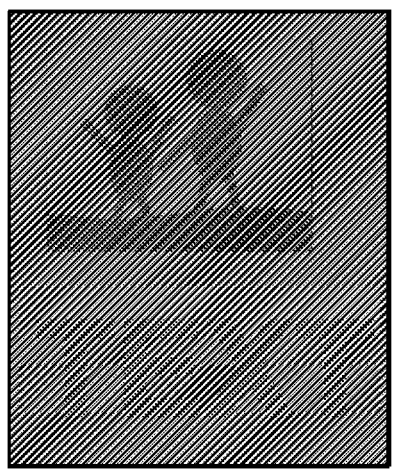

That is, a large amount of transparent ink needs to be applied, in order to fill in the white background of the paper and increase the reflection of light where there are white dots and portions near the white dots where the single color LGray has been printed, and in order to suppress the reflection of light in portions of the paper that are substantially filled in with the single color LGray. Also, because irregularity on the image surface arises in portions where inks of multiple colors such as LGray and Gray are printed, the reflection of light is comparatively weakened. The amount of transparent ink applied can thus be reduced in comparison to the vicinity of white dots and the vicinity of low densities. A full-surface coating image thus printed is schematically represented in FIG. 22B, with transparent ink being applied to the shaded portion (full surface). Note that FIG. 22A shows the original.

Figure 22C:
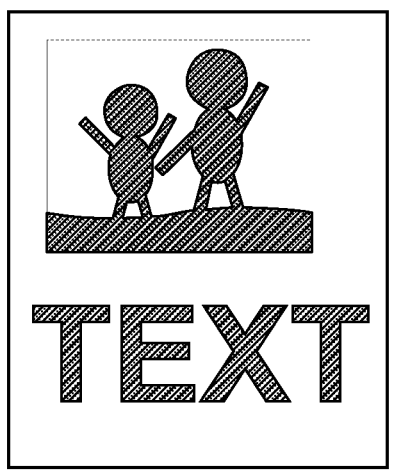
Figure 22D:
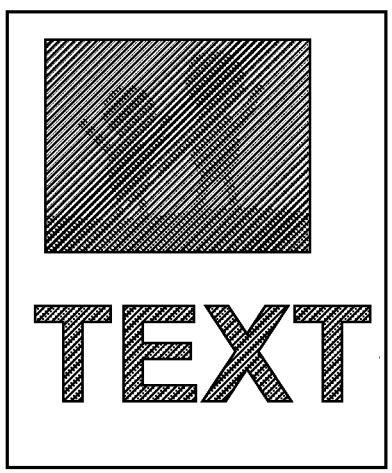

Next, in the case where glossy paper A or B is selected when in the automatic coating mode, processing is performed during coating of transparent ink to endure that transparent ink is not applied to the white dots. Depending on the application or OS, a function for correctly delivering image data serving as objects may not be provided, in which case transparent ink cannot be applied to only the image data in the print data. In such a case, an equivalent effect is obtained using a method that involves applying transparent ink to only the portions where color ink is applied and not to white dots, as an alternative to specifying image data areas. An image thus printed is schematically represented in FIG. 22C, with transparent ink being applied to the shaded portions (image data portion). In the case where a function for correctly delivering image data serving as objects is provided, transparent ink will be applied to those areas. An image thus printed is schematically represented in FIG. 22D, with transparent ink being applied to the shaded portions (image data portions).

In this case, merely setting the output value of transparent ink on the white dots to zero results in a noticeable difference in gloss when a low density portion is adjacent to a white dot. In view of this, the difference in gloss in a low density area around a white dot is less likely to be noticeable if the output value of transparent ink is gradually increased. That is, control is performed to increase the amount of transparent ink up to the vicinity of the maximum output value $R=G=B=215$ of LGray ink, as shown in FIG. 13A. Increasing the amount of transparent ink in the vicinity of the maximum ink output value $R=G=B=215$ of LGray ink is because of the tendency, in the vicinity of where pixels are hit with the single color LGray, for the degree of glossiness to increase due to the surface being filled in with pigment ink, similarly to the abovementioned full-surface coating.

Note that the maximum amount of transparent ink has an effective tolerance amount for every printing medium, with this maximum amount being set in the vicinity of $R=G=B=215$. Further, the increase in transparent ink from $R=G=B=255$ to $R=G=B=215$ transitions smoothly up to the maximum value thereof if a general approximation such as an n-order approximate curve is used, making the difference in gloss of the low density area around the white dots even less likely to be noticeable.

The output value of transparent ink in the high density area from there up to black is assumed to be constant in the present embodiment. However, similarly to the case of full-surface coating, in areas where LGray and Gray inks are used at the same time, a large amount of transparent ink is not required since irregularity occurs on the image surface, as mentioned above. That is, the output value of transparent ink that was initially raised from $R=G=B=255$ to $R=G=B=215$ may be lowered smoothly in areas, from $R=G=B=215$ to $R=G=B=0$, up to grid points where multiple inks are applied.

Switching Between Auto, Full, Off

As already described, the printer driver 220 holds the 3D LUTs of the second color conversion process 302 that are used in the print modes as parameter files, and performs suitable color conversion for each print mode by changing the LUT used in accordance with the content of the print settings. In the present embodiment, the method of applying transparent ink is changed, as mentioned above, based on setting value of the transparent ink coating mode and the setting value for paper type. Thus, the 3D LUTs of the second color conversion process 302 for use in the print modes include the following.

For print modes that do not use transparent ink, there is only a LUT for use in "Auto Coating Mode", in which the plane data of P representing transparent ink in color converted CMYKP data consists entirely of zeros. In the case where "Auto Coating Mode" is set, a print result in which transparent ink is not applied can thereby be obtained for these print modes.

For print modes that use transparent ink, a LUT that obtains a transparent ink coating result in the case where glossy paper or the like is selected when in "Auto Coating Mode" is held as a LUT for use in "Auto Coating Mode".

Further, a LUT that obtains a transparent ink coating result in full-surface coating mode is held as a LUT for use in "Full Coating Mode", with color conversion being implemented after loading one of the LUTs according to the selected transparent ink coating mode. Switching of the transparent ink coating method between the automatic coating mode and the full-surface coating mode is then realized.

Note that, as mentioned previously, a method in which transparent ink, such as a small amount of transparent ink, for instance, is applied even to media with respect to which transparent ink is not highly effective is conceivable. This is realizable if a LUT that enables such transparent ink output values to be obtained is provided with respect to the print mode. In other words, transparent ink may be applied to plain paper or the like in the case of "Auto Coating Mode".

Here, the description returns to the print settings shown in FIG. 5. Using the pull-down menu 503 displayed by the user interface module 221, the user selects an arbitrary mode from the transparent ink coating modes. Radio buttons 504 and 505 and an area 506 in FIG. 5 are advanced setting items for the case where the user setting mode is selected. These are displayed in a disabled state in the case where the automatic coating mode or the full-surface coating mode has been selected on the pull-down menu 503.

On the other hand, in the case where the user setting mode has been selected, the radio buttons are displayed in an operable state. In this user setting mode, the user selects the form file creation mode for area designation or the form combination printing mode, using the radio button 504 or 505.

An icon display area 502 is an area for displaying icons representing the concepts of the transparent ink coating modes. Here, the printer driver 220 holds icons visually representing the transparent ink coating modes, and the user interface module 221 displays an icon corresponding to the set transparent ink coating mode in the icon display area 502.

The transparent ink coating modes that are available differ for every print mode of the job settings, with the print modes being classified into the following three groups.

Print modes in which "Auto Coating Mode"/"Full Coating Mode"/"User Setting Mode" (form file creation/form combination printing) are available.

Print modes in which "Auto Coating Mode"/"Full Coating Mode" are available.

Print modes in which only "Auto Coating Mode" is available.

Print modes that are only usable in "Auto Coating Mode" are print modes in which transparent ink is not applied. In the present embodiment, with media with respect to which transparent ink is not highly effective such as plain paper and matte paper, 3D LUTs for image processing are designed on the premise that transparent ink will not be used. Thus, only "Auto Coating Mode" is usable as a transparent ink coating mode, in which case "Auto Coating Mode" will be represented as a mode in which "transparent ink not applied".

On the other hand, "Auto Coating Mode" and "Full Coating Mode", in which transparent ink is applied, are available with paper types that are able to obtain an effect such as uniform glossiness by using transparent ink. With these page types, whether "User Setting Mode" is available or not will depend on the print mode. This is because only "Auto Coating Mode" and "Full Coating Mode" are available in print modes in which a decorative effect using transparent ink is not obtained such as a print mode prioritizing speed. In print modes in which a decorative effect is not obtained, the user setting mode is thereby configured so as to not be selectable.

The print mode table shown in FIG. 4B is an example of a print mode table holding information relating to transparent ink coating modes available for each print mode. For example, with print mode (7) corresponding to the information "gloss paper A", "color", "borderless print (ON)" and "quality priority", this table represents that all of the transparent ink coating modes, namely, automatic coating mode, full-surface coating mode and user setting mode, are available. Again, with print mode (8) corresponding to the information "gloss paper A", "color", "borderless print (ON)" and "normal", this table represents that only automatic coating mode and full-surface coating mode are available.

Note that the print mode table is not limited to the configuration of the print mode table shown in FIG. 4B. For example, in the case of a configuration in which transparent ink is also applied on media such as plain paper, "Full Coating Mode" may be made available in print modes that use these media. Further, a configuration in which "User Setting Mode" is available is also possible.

Processing by UI Module

The user interface module 221 may always display the modes "Auto" "Full" and "User Setting" in the pull-down menu 503, irrespective of the print mode determined from the current print settings. Then, when one mode is selected, switching to the transparent ink coating mode that will actually be used based on the availability of the selected mode and guidance control for the user are performed.

Figure 7:
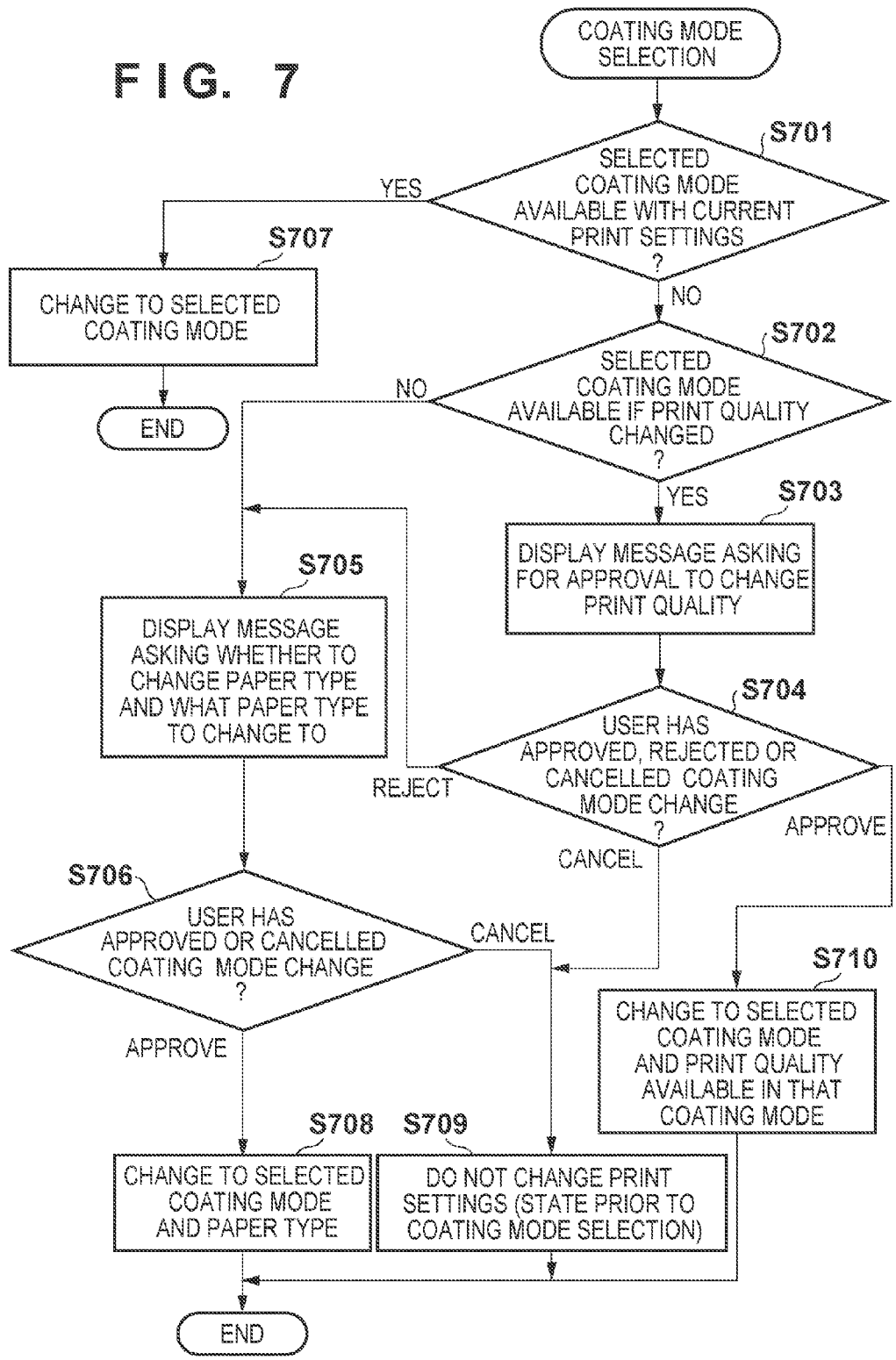
FIG. 7 is a flowchart showing a control based on the print mode table of FIG. 4B.

Controls executed by the user interface module 221 based on the print mode table of FIG. 4B will be described using FIG. 7. When an arbitrary transparent ink coating mode is selected by the user, the user interface module 221 judges at S701 whether the selected transparent ink coating mode is available in the print mode determined from the current print settings. If it is judged to be available, the processing proceeds to S707, where the mode is changed to the selected transparent ink coating mode, and this processing is ended.

Figure 8:
FIG. 8 shows an example screen displayed at S705 of FIG. 7.

On the other hand, if it is judged to be unavailable, the processing proceeds to S702, and it is determined whether there is a print quality in which the selected transparent ink coating mode is available without changing the current paper type. If it is judged that a print quality in which the selected transparent ink coating mode is available does not exist, the processing proceeds to S705, where the paper types available in the selected transparent ink coating mode are enumerated, and a message asking the user whether he or she wants to change to one of those paper types is displayed. FIG. 8 shows an example screen displayed at S705.

Subsequently at S706, the user interface module 221 waits for a response from the user about selecting another paper type and changing to that paper type, and proceeds to S708 if the change is approved, and changes the print settings to the selected transparent ink coating mode and the paper type. In the case where the change is not approved and the selection of a transparent ink coating mode is canceled at S706, the processing proceeds to S709, where all of the print settings are restored to the state prior to the transparent ink coating mode being selected, and the print settings are left completely unchanged.

Figure 9:
FIG. 9 shows an example screen displayed at S703 of FIG. 7.

On the other hand, in the case where, at the abovementioned S702, there exists a print quality in which the selected transparent ink coating mode is available, the processing proceeds to S703, where a message asking the user whether he or she wants to change to the selected transparent ink coating mode after changing to that print quality. FIG. 9 shows an example screen displayed at this S703.

Thereafter, if there is a response from the user, the response is determined at S704, and in the case where the change in print quality is approved, the processing proceeds to S710, where the user interface module 221 changes to the selected transparent ink coating mode and the print quality in which that transparent ink coating mode is available. In the case where the user's response at S704 is to cancel the change in transparent ink coating mode, the processing proceeds to S709, where the state prior to the transparent ink coating mode being selected is restored, and the print settings are left completely unchanged. Further, in the case where the user's response at S704 is to reject the change in print quality, the user interface module 221 performs the controls from the abovementioned S705 onward.

A configuration is thus adopted in which control is performed so as to enable all of the transparent ink coating modes to be selected irrespective of the print mode determined from the current print settings, and in the case where printing using a selected transparent ink coating mode cannot be executed with the current print settings, the user is informed of that fact. Compared with a configuration in which transparent ink coating modes that are not executable cannot be selected, the user is thereby able to comprehend the reason even in the case where correlation with the interfering setting is difficult to understand intuitively. This can also provide an ideal opportunity to inform the user of the reason.

With the above controls, in the case where, at S701, the selected transparent ink coating mode is unavailable in the print mode determined from the current print settings, a guidance method in which the user is only notified about the competing print setting without being presented with a change to another print setting is also conceivable.

Also, in the case where, at S702 to S703, there are a plurality of print qualities available in the transparent ink coating mode, change candidates may be determined in a specific priority order starting with the normal print quality for the current paper type, followed by a closest print quality that is higher than the current print quality. Alternatively, the change candidates can be enumerated and the user entrusted with the selection, similarly to the paper type presented at S705.

Further, as mentioned above, while control is performed based on the print mode table in FIG. 4B, the present invention is not limited only thereto. For example, in a case such as where there is another print setting that interferes with the transparent ink coating mode, it is obvious that the present invention is applicable to a configuration in which the user is similarly asked about changing that print setting.

Figure 10:
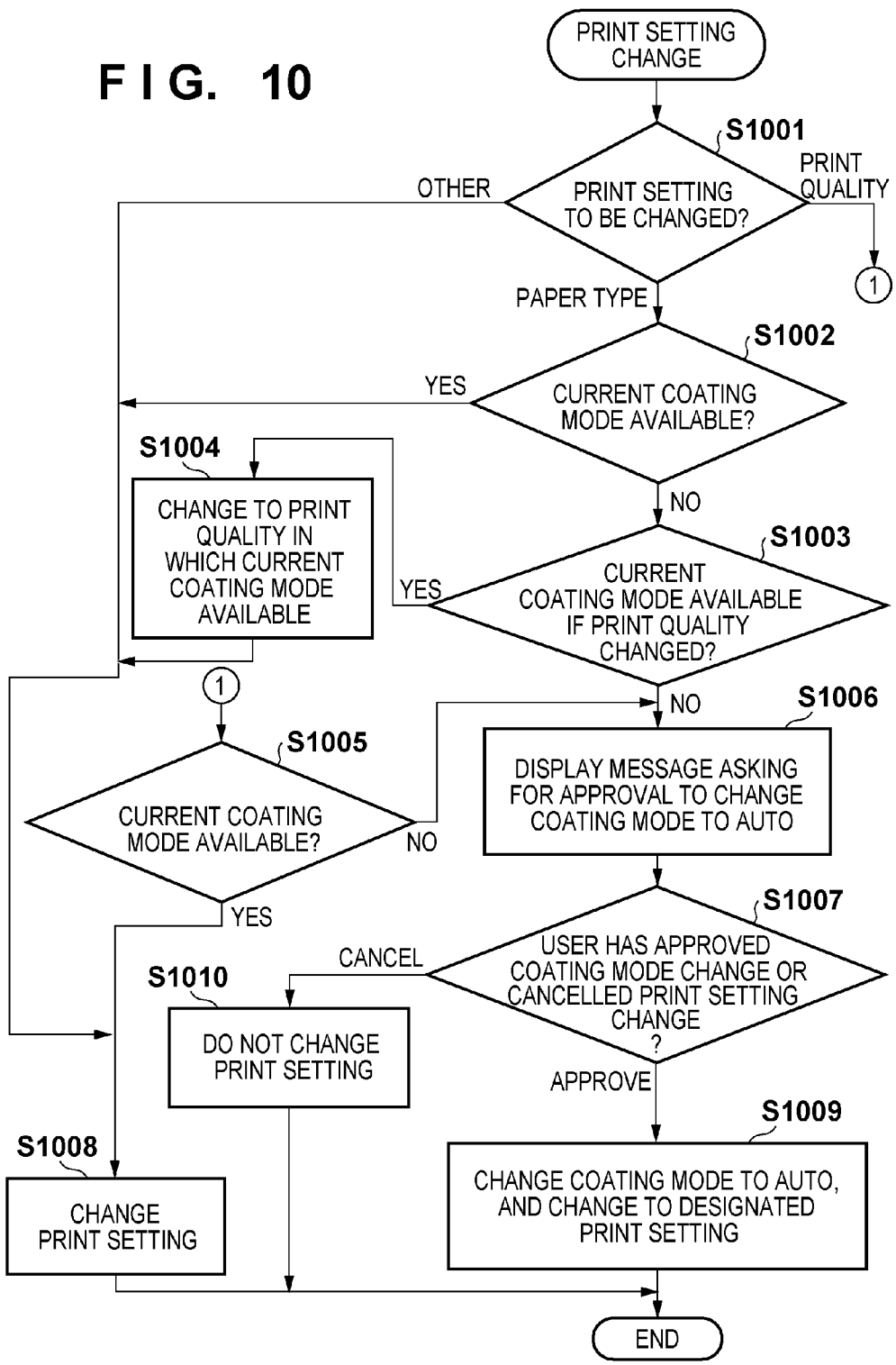
FIG. 10 is a flowchart showing a print setting change process.

Next, control in the case where, in a state in which an arbitrary transparent ink coating mode has been selected, another print setting that can affect the availability of the selected transparent ink coating mode is changed, thus changing the availability of the selected coating mode, will be described using FIG. 10.

When one of the print settings is changed by the user, it is judged at S1001 whether the setting itself and any of the settings to be additionally changed as a result of the setting change instruction are settings that affect the availability of the transparent ink coating mode. Here, in the case where the settings do not affect the availability of the transparent ink coating mode, the processing proceeds to S1008, where the setting instructed by the user and any print settings that ought to be additionally changed are directly changed. Hereafter, the setting in relation to which the change instruction is directly given by the user and any settings that are additionally changed as a result will be collectively denoted as print settings changed by a user instruction.

Also, in the case where the print setting that will be changed by the user instruction is a paper type that affects the availability of the transparent ink coating mode, the processing proceeds to S1002, where it is judged whether the transparent ink coating mode currently set will be available under the changed print settings. Here, if the transparent ink coating mode currently set will be available, the processing proceeds to S1008, where the changes to the print settings resulting from the user instruction are directly made. However, if the transparent ink coating mode currently set will not be available, the processing proceeds to S1003, where it is determined whether there is a print quality in which the current transparent ink coating mode is available with the designated paper type. If the determination result indicates that such a print quality exists, the processing proceeds to S1004, where after having changed to that print quality, the processing proceeds to S1008, where the abovementioned change processing is performed.

Figure 11:
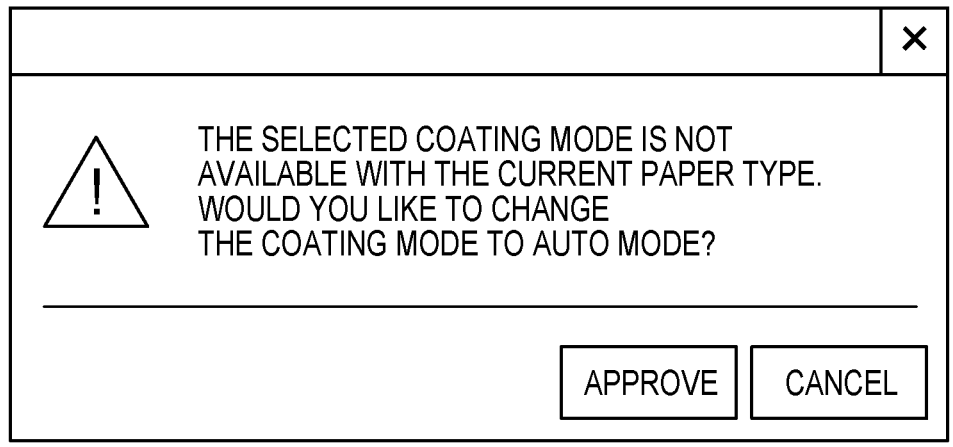
FIG. 11 shows an example screen displayed at S1006 of FIG. 10.

In the case where, at the above-mentioned S1003, such a print quality does not exist, the processing proceeds to S1006, where a message is displayed asking the user whether he or she wants to change to the automatic coating mode, which is the transparent ink coating mode available with all of the print settings. FIG. 11 shows an example screen displayed at S1006.

Thereafter, the user's response to the inquiry is judged at S1007, and in the case where the change in the transparent ink coating mode is approved, the processing proceeds to S1009, where, after having changed the transparent ink coating mode to the automatic coating mode, the other settings are changed to the print settings that are changed by the user instruction. In the case where, at S1007, the user's response is to cancel the print setting change, the processing proceeds to S1010, where the print settings prior to the print setting change being instructed are maintained, or in other words, left completely unchanged.

On the other hand, in the case where, at the abovementioned S1001, the print setting that will be changed by the user instruction is a print quality that affects the availability of the transparent ink coating mode, the processing proceeds to S1005, where it is judged whether the automatic coating mode currently set is available under that print setting. Here, if it is available, the processing proceeds to S1008, where the abovementioned change processing is performed. If it is not available, the processing proceeds to S1006, where the abovementioned processing is performed.

With the above control, in the case where the current transparent ink coating mode will not be available as a result of the print setting that will be changed by the user instruction, a configuration may be adopted where the currently available transparent ink coating mode is changed without particularly displaying a message such as shown in FIG. 11.

A configuration may also be adopted where the abovementioned message is displayed only in the case where a change will occur that greatly affects the user, such as in the case where the form file creation mode, which does not culminate in printing onto a sheet, will be changed to the automatic coating mode, which does culminate in printing.

A configuration may also be adopted where the processing transitions to S1009 for performing the change of S1006, which is the step where the user is informed of the need to change the transparent ink coating mode, without judging at S1003 to S1004 with regard to low-level settings that influence the availability of the transparent ink coating mode.

Further, control is performed based on the print mode table in FIG. 4B, as mentioned above, although the present invention is not limited only thereto. For example, in the case where there are other print settings that affect the availability of the transparent ink coating mode, it is obvious that similar control can be performed with respect to a change to those print settings.

Processing by Command Generation Module after Print Execution

Figure 12A:
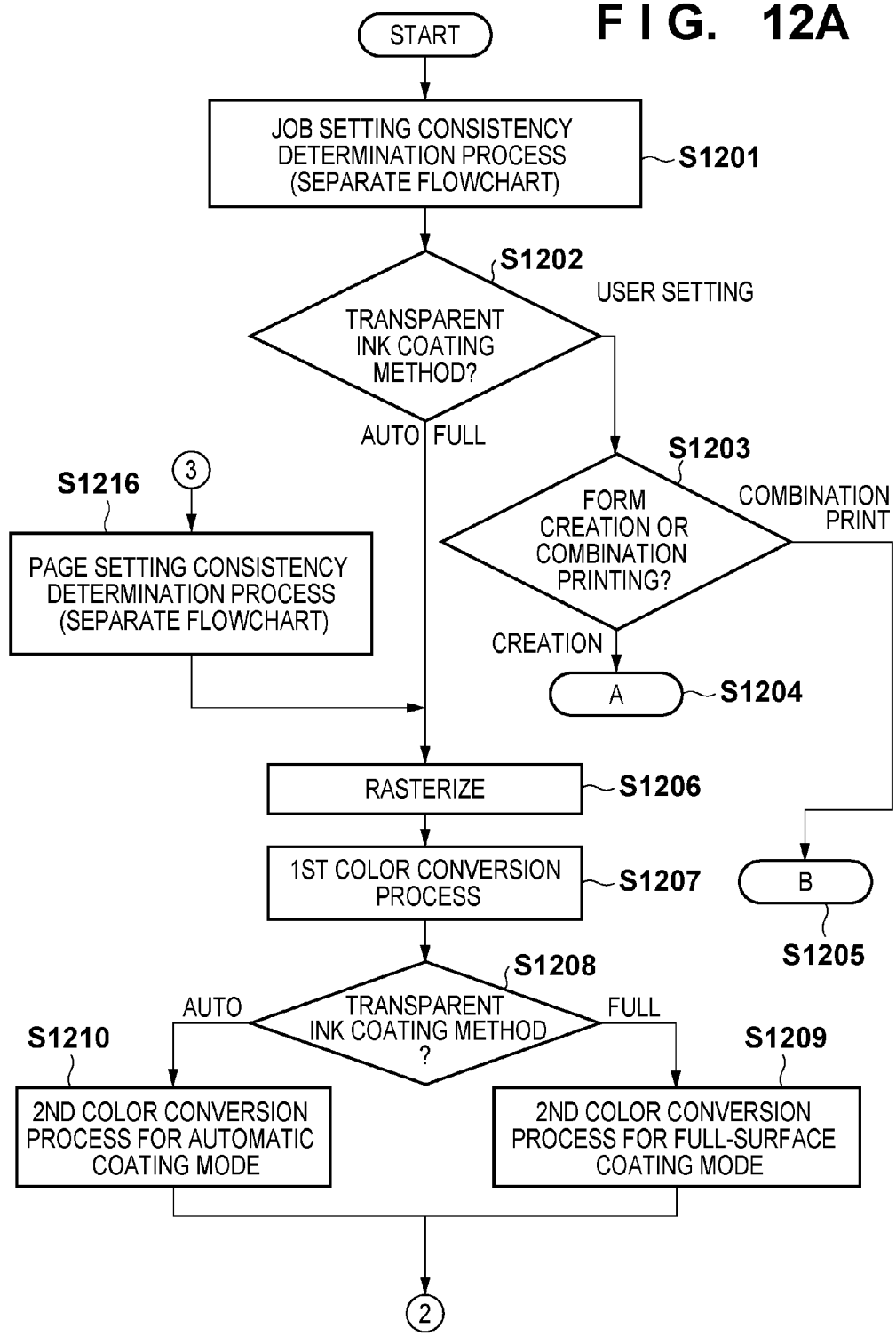
FIGS. 12A and 12B are flowcharts representing processing by a command generation module.
Figure 12B:
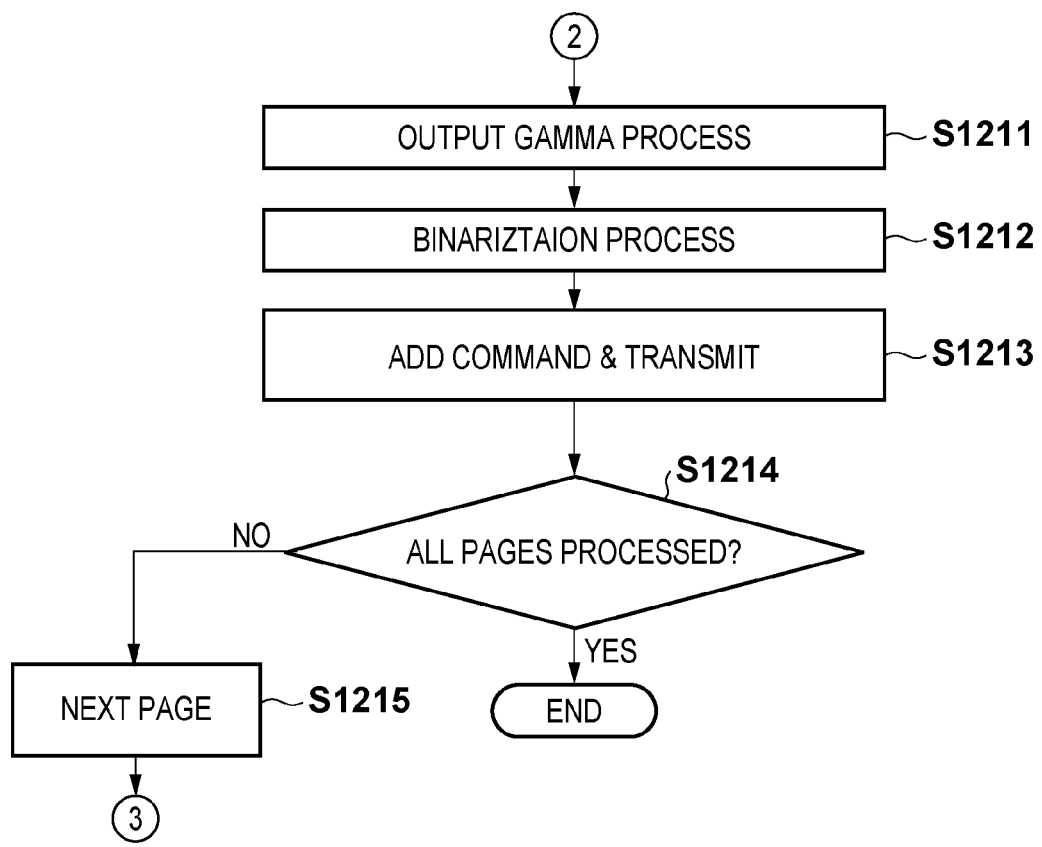

FIGS. 12A and 12B are flowcharts representing the processing of the command generation module. When printing is instructed, the command generation module 225 performs a job setting consistency determination process for determining whether there is inconsistency between the setting items with reference to the print setting information in the print job, and performing error display and/or changing the setting value of some of the items (S1201). This determination process, the details of which will be discussed later using FIG. 16, involves determining whether a combination of setting items that cannot be used is set. Note that in a print system capable of changing print settings on a page-by-page basis, the job settings are the print settings on the initial page.

Next, setting of the transparent ink coating method is determined from the job settings (S1202). Here, in the case where it is determined that the transparent ink coating mode is "User Setting Mode", it is further determined which of "Form File Creation Mode" and "Form Combination Printing Mode" is set (S1203). If the form file creation mode is set, the processing proceeds to a form file creation process (S1204). If the form combination printing mode is set, the processing proceeds to a form combination printing process (S1205). The details of these processes will be discussed later.

On the other hand, in the case where it is determined that the transparent ink coating mode is "Auto Coating Mode" or "Full Coating Mode", rasterization is performed on the basis of the print job of the current page, and multi-value raster data is created (S1206). This rasterization process may be implemented using either a program provided by the driver or a function provided by the OS.

Next, at S1207, the first color conversion process 301 for converting RGB data of the input image to data R'G'B' suitable for a color space that depends on the printing apparatus 2 is performed (S1207). Next, when performing the second color conversion process 302, the setting of the transparent ink coating mode is determined (S1208). If the determined result indicates that "Full Coating Mode" is set, the second color conversion process 302 for the full-surface coating mode is performed, and the data R'G'B' is converted to CMYKP 8-bit data (S1209). Here, the second color conversion process 302 for the full-surface coating mode is performed by loading and using a 3D LUT for the full-surface coating mode.

On the other hand, if "Auto Coating Mode" is set, the second color conversion process 302 for the automatic coating mode is performed, and the data R'G'B' is converted to CMYKP 8-bit data (S1210). Here, the second color conversion process 302 for the automatic coating mode is performed by loading and using a 3D LUT for the automatic coating mode. Note that, as mentioned above, in the case where gloss paper or the like is set for paper type, the LUT used here for the automatic coating mode is for performing transparent ink coating such as described with FIG. 13B. On the other hand, if another paper type is set, a LUT for obtaining a conversion result without applying transparent ink is used.

In the automatic coating mode, whether or not to apply transparent ink thus depends on the setting value for paper type, and an improvement in operability is realized by not causing the user to make complex judgments. Note that while, for the sake of simplicity, an example using the four color inks CMYK was also described here, it is obvious that the present invention is not limited thereto.

Next, after performing the output gamma process 303 (S1211), the binarization process 304 is performed (S1212). In the present embodiment, the CMYKP 8-bit data obtained here is quantized to CMYKP 1-bit data, because the printing apparatus 2 is a binary printing apparatus. The data is then converted to a print command interpretable by the printing apparatus 2 and transmitted (S1213). The print command is sent to the printing apparatus 2 via the command transmission/reception module 226, and an image corresponding to the print command received at the printing apparatus 2 is formed on the printing medium.

Finally, at S1214, it is determined whether all of the pages have been processed, and if there are any remaining pages, the processing proceeds to the next page (S1215). In the case where the print setting information is designated on a page-by-page basis, processing is again performed from S1216, after performing an after-mentioned page setting consistency determination process at S1216. Thereafter, when all the pages have been processed, this processing is ended.

Consistency Process Relating to Transparent Ink Coating Mode

Mixed Inter-page Setting Determination Process by Page Composition Module

Figure 15:
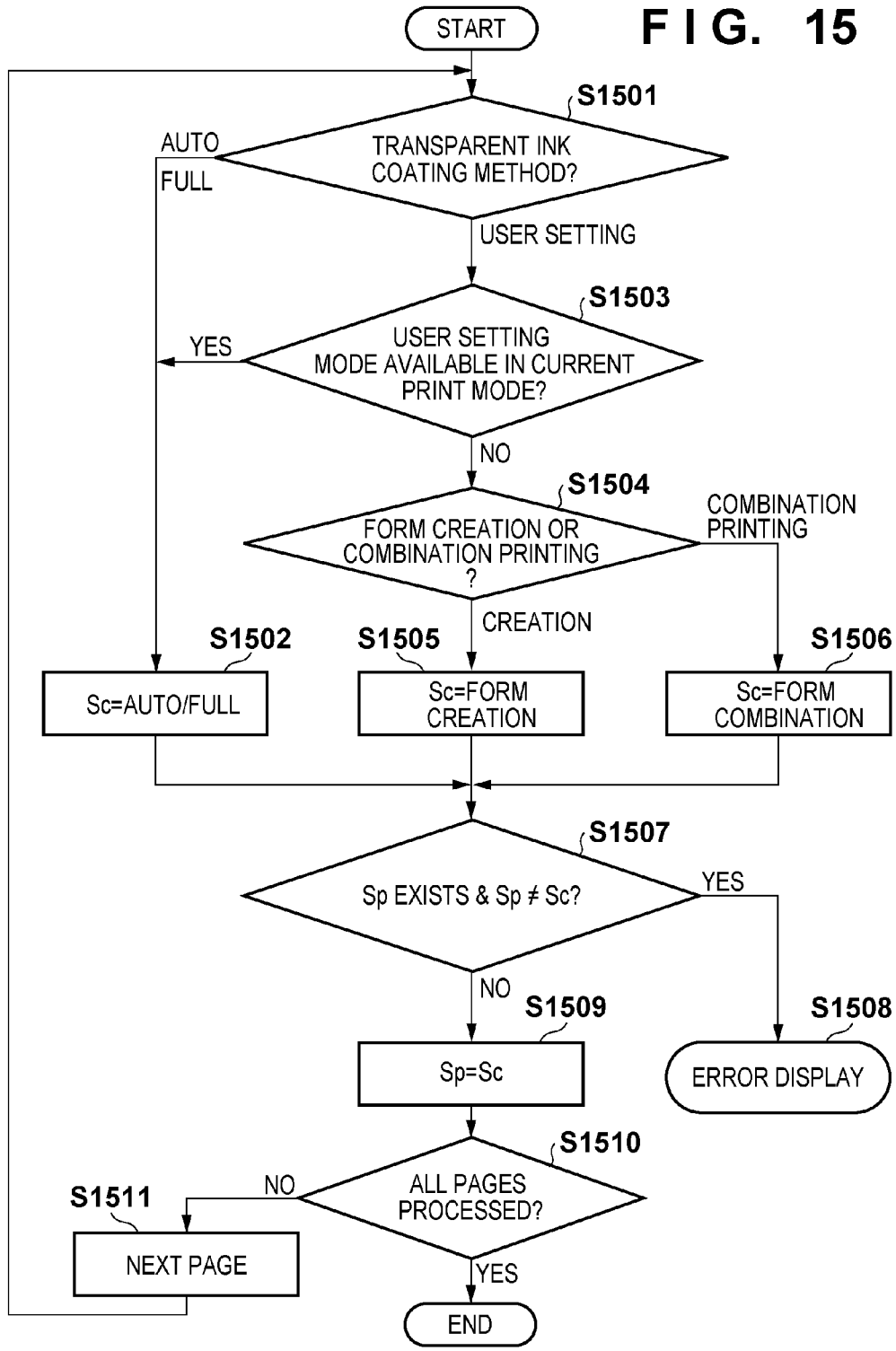
FIG. 15 is a flowchart representing a mixed transparent ink coating mode detection process.

FIG. 15 is a flowchart representing a mixed transparent ink coating mode detection process by the page composition module 222. First, the page composition module 222 refers to the setting value of the transparent ink coating mode from the print settings for the current page (S1501). Here, in the case where the setting of the transparent ink coating mode is the automatic coating mode or the full-surface coating mode, a flag indicating "Auto/Full" is stored in a variable Sc on the RAM 14 as the setting information of the current page (S1502).

On the other hand, in the case where, at S1501, the transparent ink coating mode is the user setting mode, it is determined, with reference to the print mode table shown in FIG. 4B, whether the user setting mode is available in the print mode corresponding to the current print settings (S1503).

If it is determined that the user setting mode cannot be used, the processing proceeds to S1502. However, if it is determined that the user setting mode can be used, the processing proceeds to S1504, where it is determined whether the form file creation mode or the form combination printing mode is set. In the case of the form file creation mode being set, a flag indicating form file creation mode is stored in Sc (S1505). If the form combination printing mode is set, a flag indicating the form combination printing mode is stored in Sc (S1506).

Subsequently, at S1507, in the case where there exists a variable Sp on the RAM 14 indicating the setting information of the previous page, it is determined whether the values of the flags stored in Sc and Sp are equal.

In the case where the determination result indicates that Sp exists, and that the values of Sc and Sp are not equal, error information indicating that printing cannot be continued with the current print settings is notified to the status information display module 227, and the processing is ended (S1508).

As a result of this processing, switching to a transparent ink coating mode setting other than the automatic coating mode or the full-surface coating mode between pages is prohibited. Since switching to a setting other than the automatic coating mode or the full-surface coating mode between pages is difficult in terms of the configuration of the command generation module 225, the object of this processing is to terminate such print jobs beforehand in the page composition module

222. For example, if the mode is switched to the automatic coating mode during operation in the form file creation mode, processing to end the form file creation mode and processing to start printing need to be executed. Executing processing associated with initializing and terminating entire jobs such as these between pages is difficult in terms of sequence.

Also, in the case where, at S1507, Sp does not exist or Sc and Sp are equal, the value of Sc is substituted for Sp (S1509). Then, at S1510 it is determined whether there are any remaining pages, and if there are remaining pages, the processing proceeds to the next page (S1511), and the processing from S1501 to S1509 is repeated. Thereafter, if there are no remaining papers, this processing is ended.

The page composition module 222 executes this processing instead of the command generation module 225, since pages subsequent to the current page in a print job cannot be preread by the command generation module 225, depending on the printing system. In the case where pages can be preread by the command generation module 225, the processing of FIG. 15 may be implemented by the command generation module 225.

Note that this processing is unnecessary in a printing system that is not able to change the print settings on a page-by-page basis. Also, the processing in FIG. 15 indicates only the process of detecting mixing of transparent ink coating modes performed by the page composition module 222, and processing typically performed by the page composition module 222, such as page layout change and page duplication, is not described.

Job Setting Consistency Determination Process

Figure 16:
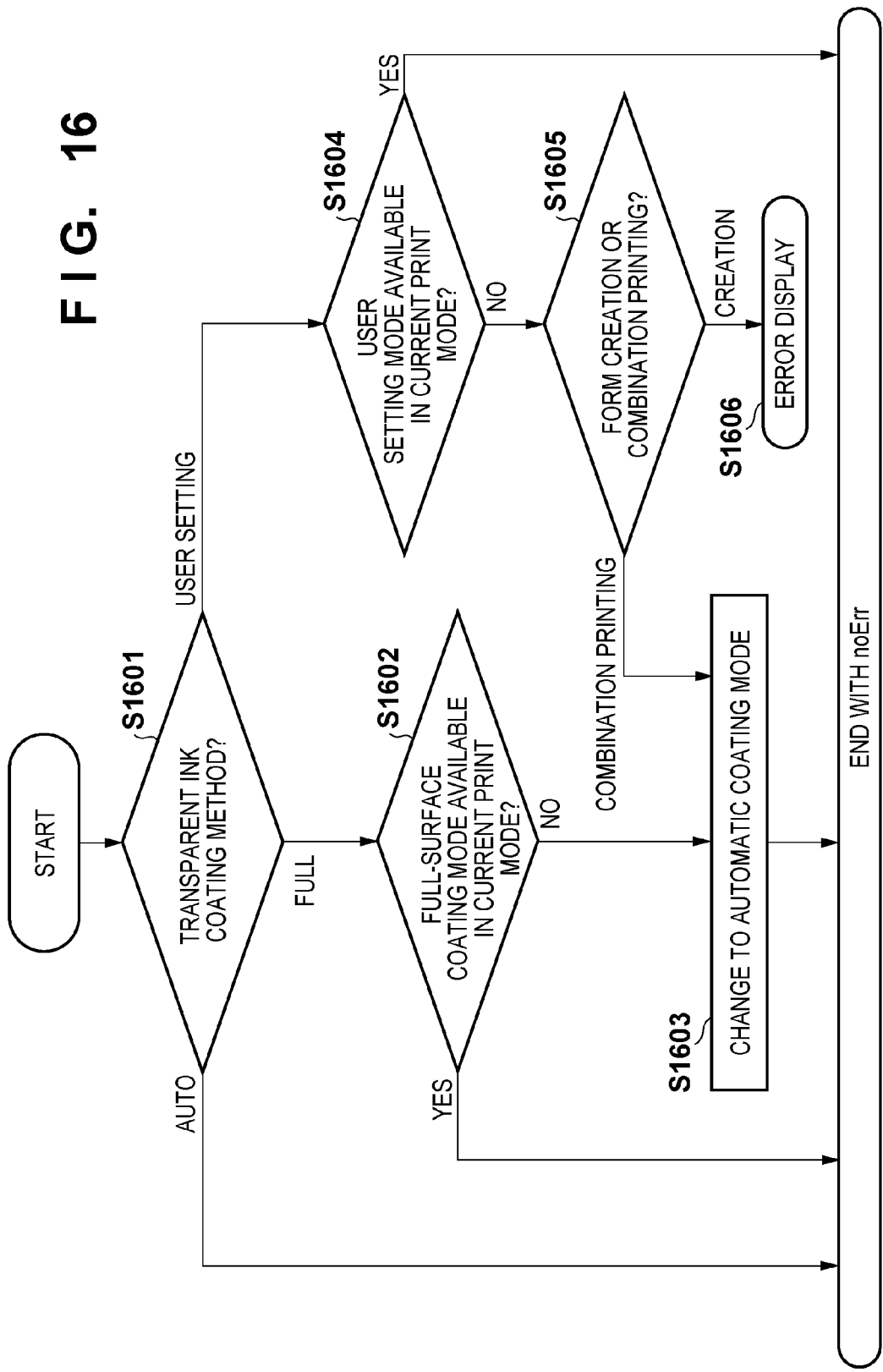
FIG. 16 is a flowchart representing a job setting consistency determination process (mismatch processing) during data generation.

FIG. 16 is a flowchart representing a determination process (mismatch processing) for determining the consistency of job settings during data generation by the command generation module. The command generation module 225 firstly refers to the setting value of the transparent ink coating mode from the print setting information, in mismatch processing during data generation (S1601). If the setting value of the transparent ink coating mode indicates the automatic coating mode, the mismatch determination process is ended assuming there is no mismatch, since the automatic coating mode is available in all of the print modes.

If the setting value of the transparent ink coating mode at S1601 indicates the full-surface coating mode, it is determined, with reference to the print mode table shown in FIG. 4B, whether the full-surface coating mode is available in the print mode corresponding to the current print settings (S1602). If the determination result indicates that the full-surface coating mode is available, this processing is ended since there is no mismatch. However, if it is determined that the full-surface coating mode cannot be used in the set print mode, the transparent ink coating mode is changed to the automatic coating mode (S1603), and this processing is ended.

Further, if the setting value of the transparent ink coating mode at S1601 indicates the user setting mode, it is determined, with reference to the print mode table shown in FIG. 4B, whether the user setting mode is available in the print mode corresponding to the current print settings (S1604). If the determination result indicates that the user setting mode is available, this processing is ended since there is no mismatch. However, if it is determined that the user setting mode cannot be used with the set print mode, it is determined whether the form file creation mode or the form combination printing mode of the user setting mode is set (S1605). Here, if the form combination printing mode is set, the transparent ink coating mode is changed to the automatic coating mode (S1603), and this processing is ended. If the form file creation mode is set, error information indicating that form creation cannot be performed with the current print settings is notified to the status information display module 227 (S1606), and the processing is ended.

In the present embodiment, in the case where a transparent ink coating mode that cannot be used in the print mode corresponding to the print settings is set, the transparent ink coating mode is changed to the automatic coating mode, which is the default setting value, so as to enable the print processing to be continued. Exceptionally, however, in the case of a form file creation job in the user setting mode, error display is performed and the print processing is canceled. This is because printing will be performed if processing is continued by changing to another coating mode as a result of the mismatch determination process of the command generation module 225, whereas the form creation process involves only form file generation and not printing. The undesirable result of paper being wastefully consumed when unexpected print processing arises, despite the user who designated form file creation not anticipating output processing to printing media.

Note that while, in the present embodiment, the status information display module 227 was applied the driver configuration module, error information may be notified using the print support function 211 of the OS provided by the OS, as mentioned above. In this case, when the command generation module 225 notifies error information to the user, notification can be performed using the print support function 211 of the OS, rather than notifying the status information display module 227.

Also, while a configuration in which the command generation module 225 performs the job setting consistency determination process was adopted, a configuration may be adopted in which another module constituting the printer driver 220 performs the consistency determination process, and the result thereof is notified to the command generation module 225.

Page Setting Consistency Determination Process by Command Generation Module

Figure 17:
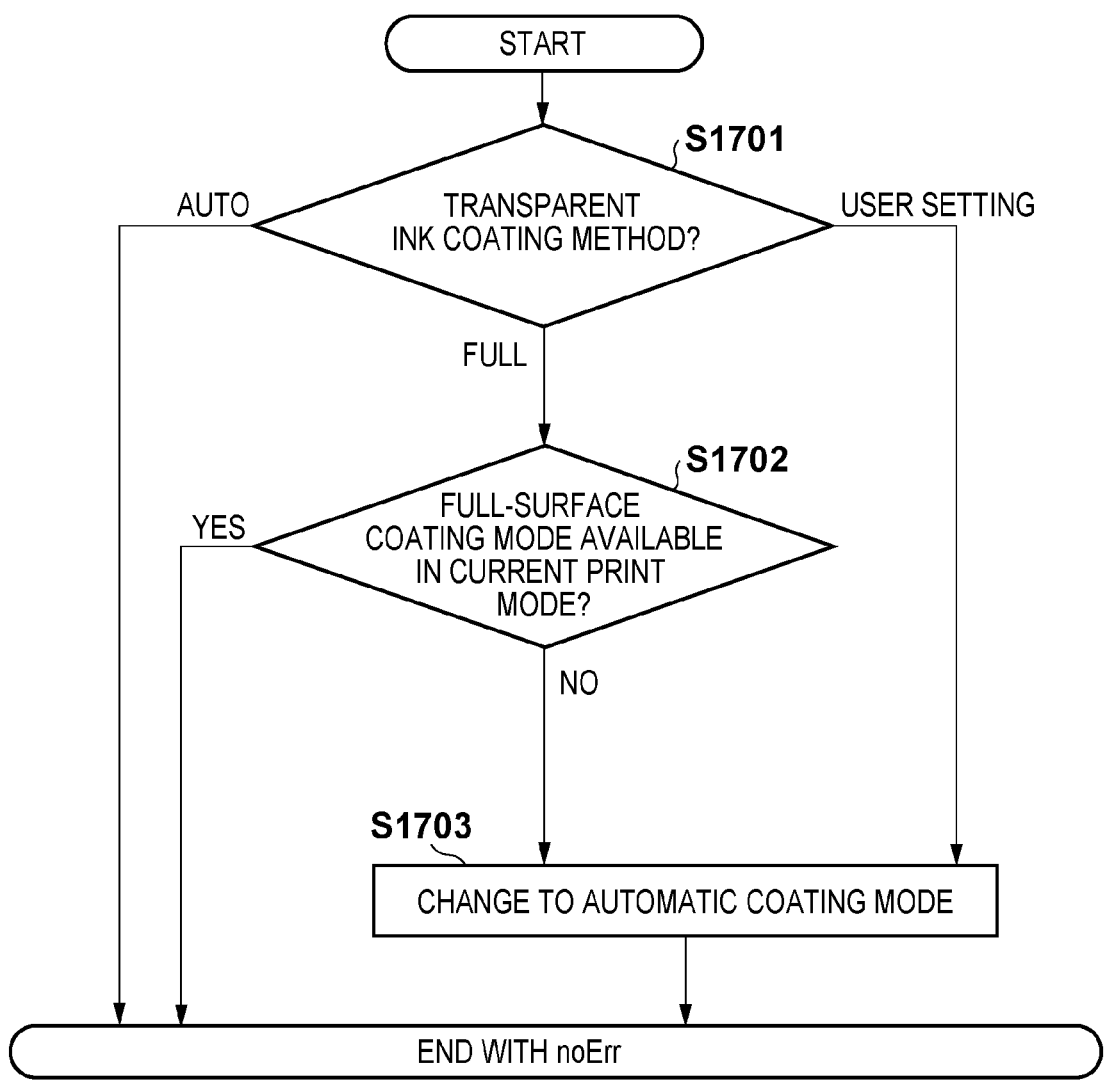
FIG. 17 is a flowchart representing a page setting consistency determination process executed by the command generation module at S1216 of FIG. 12A.

FIG. 17 is a flowchart representing a determination process for determining the consistency of page settings executed by the command generation module at S1216 of FIG. 12A. The command generation module 225 firstly refers to the setting value of the transparent ink coating mode from the print setting information of the current page (S1701). Here, in the case where the setting value of the transparent ink coating mode indicates the automatic coating mode, the processing is ended without doing anything, similarly to the job setting consistency determination process.

Also, if the setting value of the transparent ink coating mode indicates the full-surface coating mode, it is determined, with reference to the print mode table shown in FIG. 4B, whether the full-surface coating mode is available in the print mode corresponding to the current print settings (S1702). If the determination result indicates that the full-surface coating mode is available, this processing is ended since there is no mismatch. On the other hand, if it is determined that the full-surface coating mode cannot be used in the set print mode, the transparent ink coating mode is changed to the automatic coating mode (S1703), and the processing is ended.

Further, if the setting value of the transparent ink coating mode indicates the user setting mode, the transparent ink coating mode is changed to the automatic coating mode (S1703), and the processing is ended. Since changing the transparent ink coating mode to the user setting mode is not permitted at the timing at which this page setting consistency determination process is executed, the user setting mode is uniformly changed to the automatic coating mode.

Note that in a printing system in which print settings cannot be changed on a page-by-page basis, this page setting consistency determination process is unnecessary. Also, while a configuration was described in which the command generation module 225 performs the page setting consistency determination process, a configuration may be adopted in which the consistency determination process is performed by another module configuring the printer driver, and the result thereof is notified to the command generation module 225.

Operation in User Setting Mode Form File Creation Mode

Here, the form file creation mode of the user setting mode will be described. When the user selects the user setting mode of the pull-down menu 503 and the form file creation mode on the screen of FIG. 5 displayed by the user interface module 221, the printer driver 220 performs form file creation when printing is executed. FIG. 18A shows an example screen of the area 506 when the form file creation mode is selected. Existing form file list screens 1801 and 1802 enumerate form files that have already been created. The column heading 1801 displays form file information such as the title, creation date-time, page size, number of pages, borderless print on/off, and paper orientation of the form files.

Here, particularly paper size, borderless print on/off, paper orientation and the like is information relating to the page layout of a form, and allows the user to confirm that the original document targeted for combining has a matching layout, when after-mentioned form combination printing is performed. A configuration that includes settings such as double-sided printing and multi-page printing for consolidating multiple pages of data into the area of a single page is also conceivable.

A button 1803 for deleting created form files is a button for the user to select a form file that he or she wants to delete from the form file list screen 1802, and instruct deletion of that form file when pressed. A form filename input field 1804 is a field for the user to input a title to be given to the form file that will subsequently be created, and a form file having the input form title is created when print processing is executed. Thereafter, a form having that title will then be displayed on the form file list screen 1802 when this screen is displayed.

The form file creation process performed at S1204 by the command generation module will be described in detail with reference to FIG. 19, in the case where print processing is executed in the form file creation mode based on the settings on the user interface. Note that the form file structure will be discussed later.

Firstly, a prescribed location in the external storage device 15 is referenced, and in the case where there is a form file in incomplete form, that form file is deleted (S1901). The object of this processing is to delete an incomplete form file that remains in the case where, for instance, the form file creation process was improperly terminated during processing.

Next, it is checked whether the number of form files is greater than or equal to a prescribed upper limit (S1902), and if not, the processing proceeds to S1904. If the number of form files is greater than or equal to the prescribed upper limit, error information indicating that the number of form files has reached the upper limit is notified to the status information display module 227 (S1903), and the processing is ended. The object of this processing is to avoid overloading the external storage device 15 due to a large number of form files being generated and stored.

Next, the form name in the print setting information is checked (S1904), and in the case where a correct form name is designated, the processing proceeds to S1905. The command generation module 225 judges the form name to be normal in the case where the form name is not blank and there are no existing form files having the same title. In the case where the form name is incorrect, the command generation module 225 notifies error information indicating that the form name is incorrect to the status information display module 227 (S1903), and ends the processing. The object of this processing is to avoid unintentionally generating or overwriting form files.

Next, a blank form file is created in a prescribed location for creating form files in the external storage device 15 (S1905), and a job header is written into the created form file (S1906).

Figure 20A:
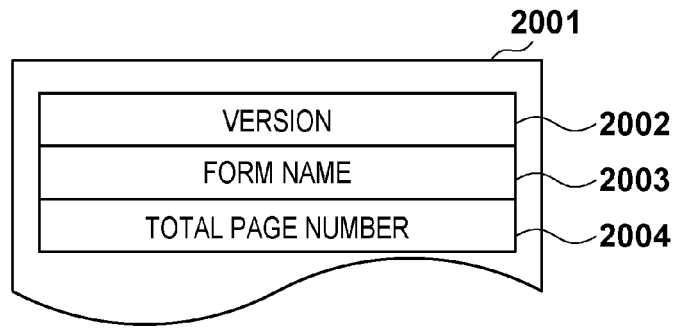
FIGS. 20A, 20B and 20C show an example of a form file.

Here, the structure of the job header will be described in detail with reference to FIG. 20A. This job header 2001 is constituted by a version 2002, a form name 2003 and a total page number 2004. The version 2002 represents version information relating to the format of the form file. The form name 2003 represents the title of the form file, with form names determined to be correct at S1904 being stored. The total page number 2004 represents the number of pages of transparent ink elimination area information that exist in the form file, and is stored at an after-mentioned S1915.

Figure 19:
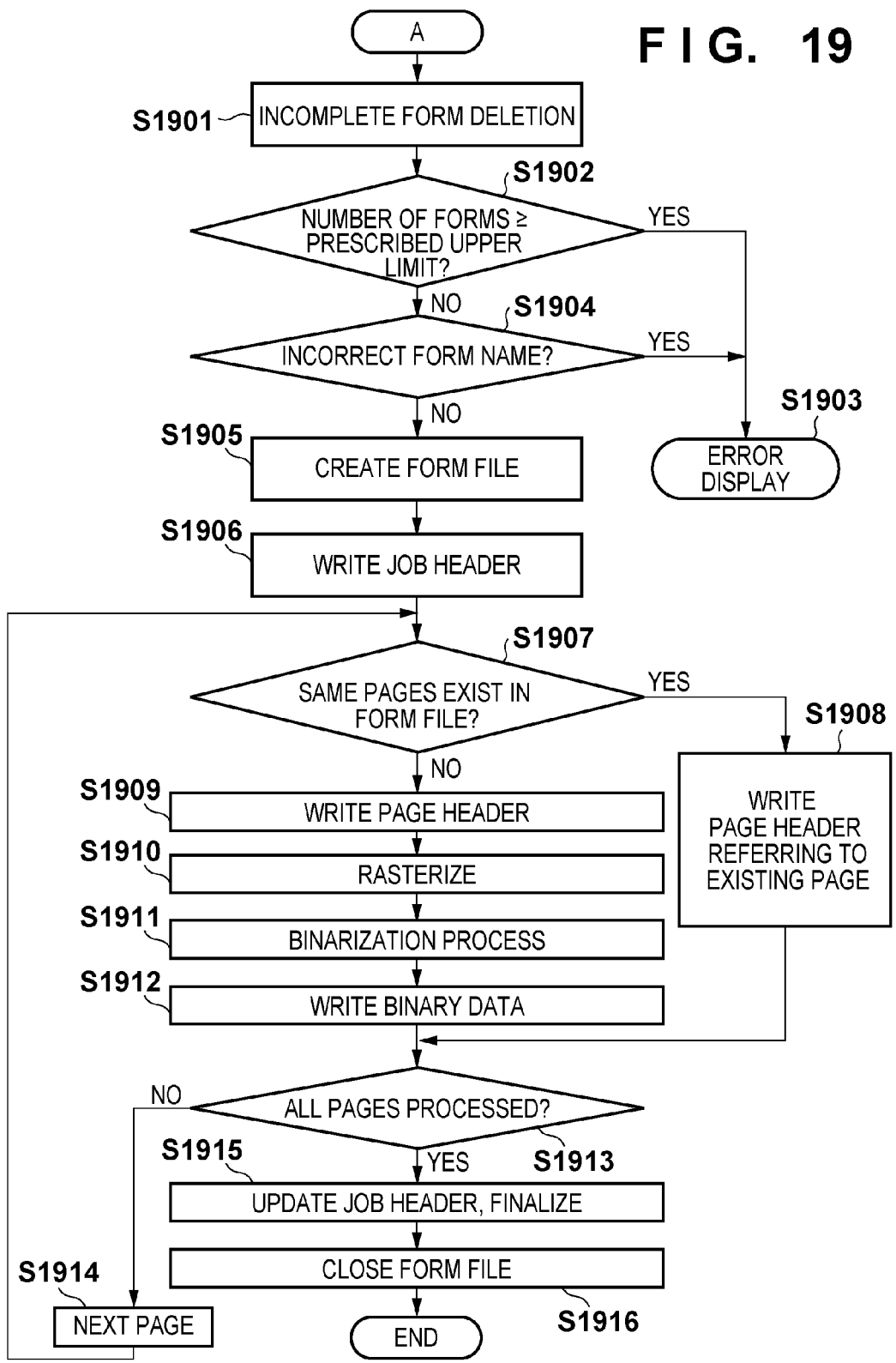
FIG. 19 is a flowchart showing a form file creation process.

Returning here to the processing of FIG. 19, it is checked whether pages having the same transparent ink elimination area exist in the form file, after the job header has been written (S1907). The command generation module 225 judges that the same transparent ink elimination area already exists in the case where it is recognized that the second copy onward is being printed. If the judgment result indicates that the same transparent ink elimination area exists, the processing proceeds to S1908, where a page header including information referring to the existing page is written, and the processing on the current page is ended. This processing enables the form file creation process to be completed quickly, and form files to be reduced in size.

Figure 20B:
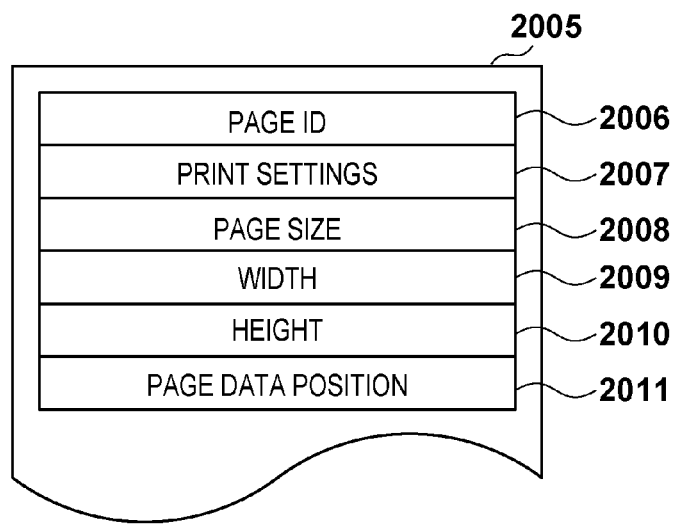

On the other hand, in the case where the same transparent ink elimination area does not exist, the processing proceeds to S1909, where the page header is written. Here, the structure of the page header will be described in detail with reference to FIG. 20B. A page header 2005 is constituted by a page ID 2006, a print setting 2007, a page size 2008, a width 2009, a height 2010 and a page data position 2011.

The page ID 2006 is an identifier (ID) for uniquely identifying a page. The print setting 2007 includes various print settings for when printing is executed in the form file creation mode. These print settings include information relating to paper size and print orientation, and are referred to by the user interface module 221 when displaying a list of form files. The page size 2008 represents the size of the transparent ink elimination area referred to by the page header 2005 in byte units. The width 2009 and the height 2010 represent the width and height of the transparent ink elimination area referred to by the page header 2005 in pixel units. The page data position 2011 represents the position of the transparent ink elimination area referred to by the page header 2005, with an offset position from the start of the form file being stored.

After writing the abovementioned page header, rasterization is performed on the basis of the print job of the current page, and multi-value raster data is created (S1910). The multi-value raster data is then binarized, and binary raster data is created (S1911). Here, the multi-value raster data are binarized such that pure white areas are "1" and areas other than the pure white areas are "0". The binary raster data thus created is written to the form file (S1912). This binary raster data represents the transparent ink elimination area information of the current page, and transparent ink is not applied to the "0" areas.

Areas that are other than pure white are thus regarded as transparent ink elimination areas that the user has designated as form areas, and areas that are other than pure white are all saved as "0". With transparent ink used by an inkjet printer, the greatest effect is typically exhibited by applying the transparent ink to the entire print area.

On the other hand, decorative character and design portions typically occupy a small amount of the overall area. Thus, transparent ink is applied in areas where there are no characters or designs as described above to ensure that effects such as uniform glossiness and expanded color gamut do not diminish even when decorative effects are imparted.

Next, the command generation module 225 checks whether there are any remaining pages (S1913), and, if there are, refers to the next page (S1914) and returns to S1907. If there are no remaining pages, the page number information stored in the job header is updated to the final information (S1915). At the same time, the command generation module 225 adds information indicating that form file creation was completed normally. This information may be included in the job header, or the fact that processing was completed normally may be represented by creating a special title for the form file. Alternatively, a separate management list for storing information relating to form files that have been created normally as a list may be created, and the fact that processing was completed normally may be represented by adding an entry to this list. A form that does not have information indicating that form file creation was completed normally added at the abovementioned S1915 is deleted as an incomplete form file at S1901, when form file creation is next performed. Finally, the command generation module 225, at S1916, closes the form file and ends this form file creation process.

As described above, the command generation module 225, on receiving a print job in the form file creation mode, creates a form including transparent ink elimination area information as an external file in the external storage device 15, rather than supplying a print command to the printing apparatus 2.

Structure of Form Data

Figure 20C:
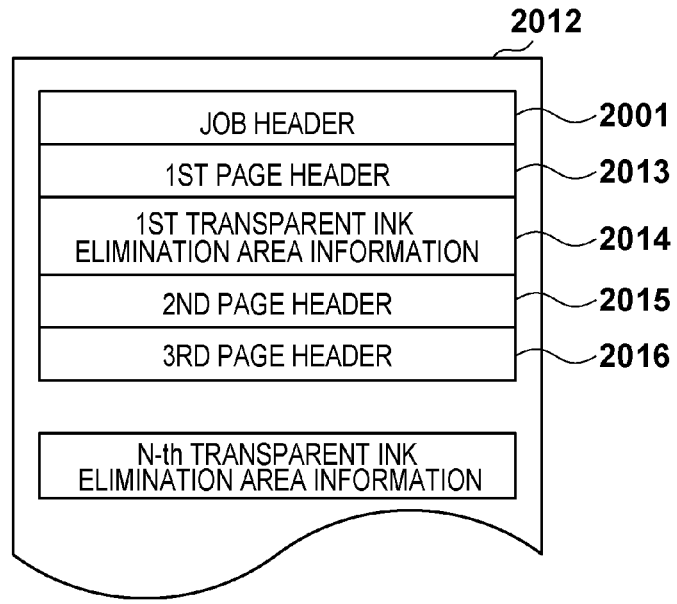

An example of a form file thus created will be described in detail with reference to FIG. 20C. At the start of the form file 2012 is a job header that was added at S1906. Next are a first page header 2013 and first transparent ink elimination area information 2014. The start position of the first transparent ink elimination area information 2014 is stored in a page data position, which is one of the elements of a first page header 2013.

Next is a second page header 2015. Here, it is assumed that the command generation module 225 judges at S1907 of FIG. 19 that second transparent ink elimination area information is the same as the first transparent ink elimination area information. In such a case, the start value of the first transparent ink elimination area information 2014 is stored in a page data position, which is one of the elements of the second page header 2015. Such a page header that refers to an existing page is created by the processing of S1908 of FIG. 19. After that, page headers, for example, 3rd page header 2016, and transparent ink elimination area information are repeatedly stored as required.

Form Combination Printing Mode

Subsequently, the form combination printing mode of the user setting mode will be described. When the user selects the user setting mode of the pull-down menu 503 and the form combination printing mode 505 on the screen of FIG. 5 displayed by the user interface module 221, the printer driver 220 performs form combination printing at the time of print execution. FIG. 18B shows an example screen of the area 506 when the form combination printing mode is selected. Form files that have already been created are listed in the form file list screens 1801 and 1802 on this screen, similarly to the form file creation mode. The column heading 1801 displays form file information such as the title, creation date-time, paper size, number of pages, borderless print on/off, and paper orientation.

The user selects the form file in which a coating area to be used in the form combination printing from this list. Here, a radio button 1813 is a button for inverting the areas to be applied with transparent ink and the areas not to be applied with transparent ink. A pull-down menu 1814 is a menu for designating whether to apply page-by-page area designation of the form in order to pages targeted for combining or whether to apply the area designation of the first page to all pages targeted for combining, when performing form combination on a form file composed of multiple pages. A pull-down menu 1815 is a menu for enabling the user to designate a pattern to be used when form combination is performed.

A pattern is an image representing a design that is repeatedly applied to an area designated in a form file as an area in which transparent ink is not to be applied, and, similarly to a form file, designates the coating area of transparent ink.

A pull-down menu 1816 is a menu for designating the size of the pattern. Note that a configuration is adopted in which the image of the abovementioned pattern is determined by the designated pattern type and size, and that the printer driver 220 holds pattern images corresponding to combinations of these in advance. However, a configuration may be adopted in which the user is able to designate an arbitrary area designation file, similarly to a form file.

All images, including these configurations, for designating the transparent ink coating area separately to a form file will be denoted below as a pattern. This configuration enables the design to be changed slightly using an image that the user wants to combine with a simple operation, without having to recreate the form data from the beginning, and enables a more flexible form combination function to be provided for imparting printed material with decorativeness.

Figure 21A:
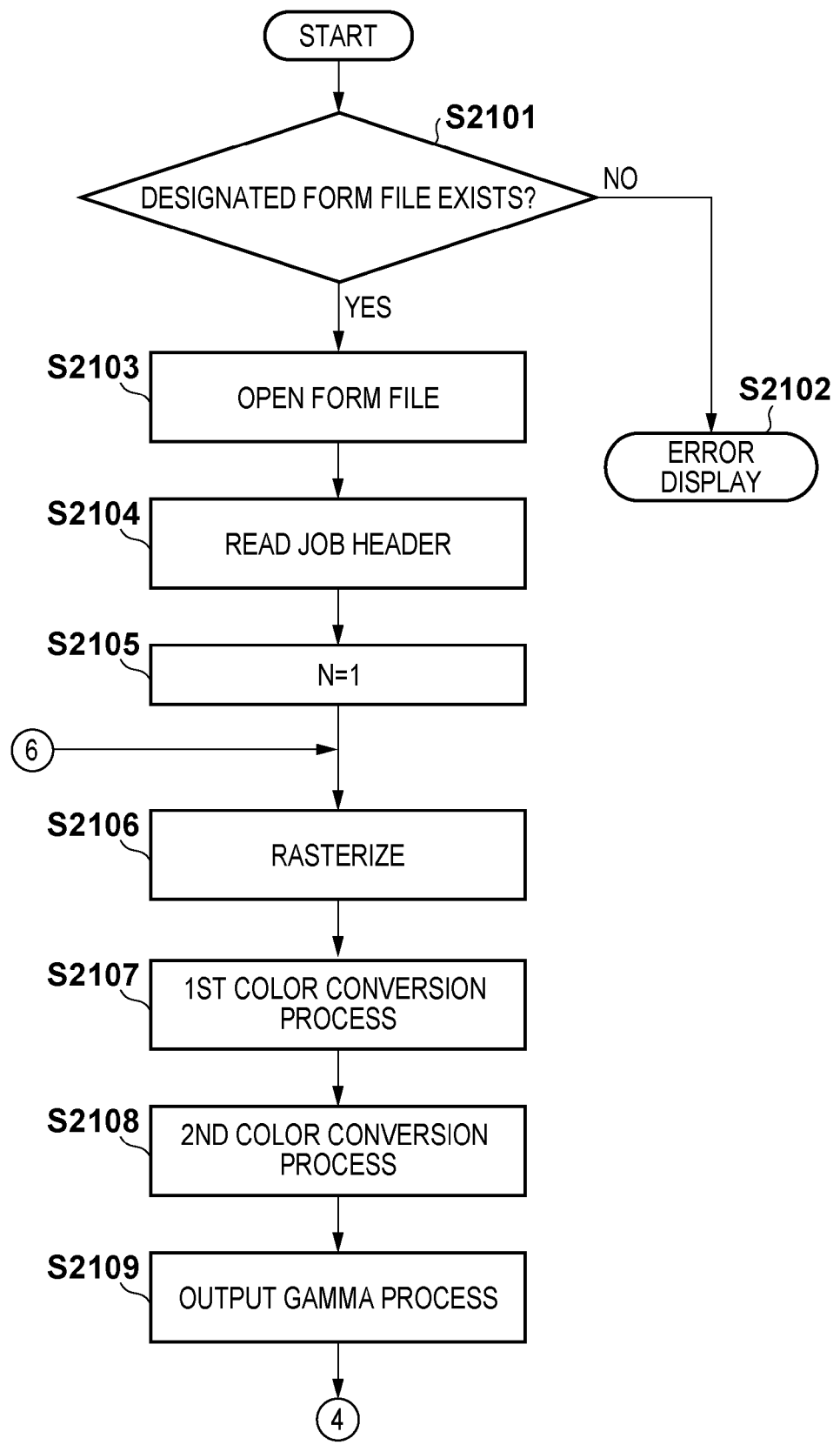
FIGS. 21A to 21C are flowcharts showing a form combining process.
Figure 21B:
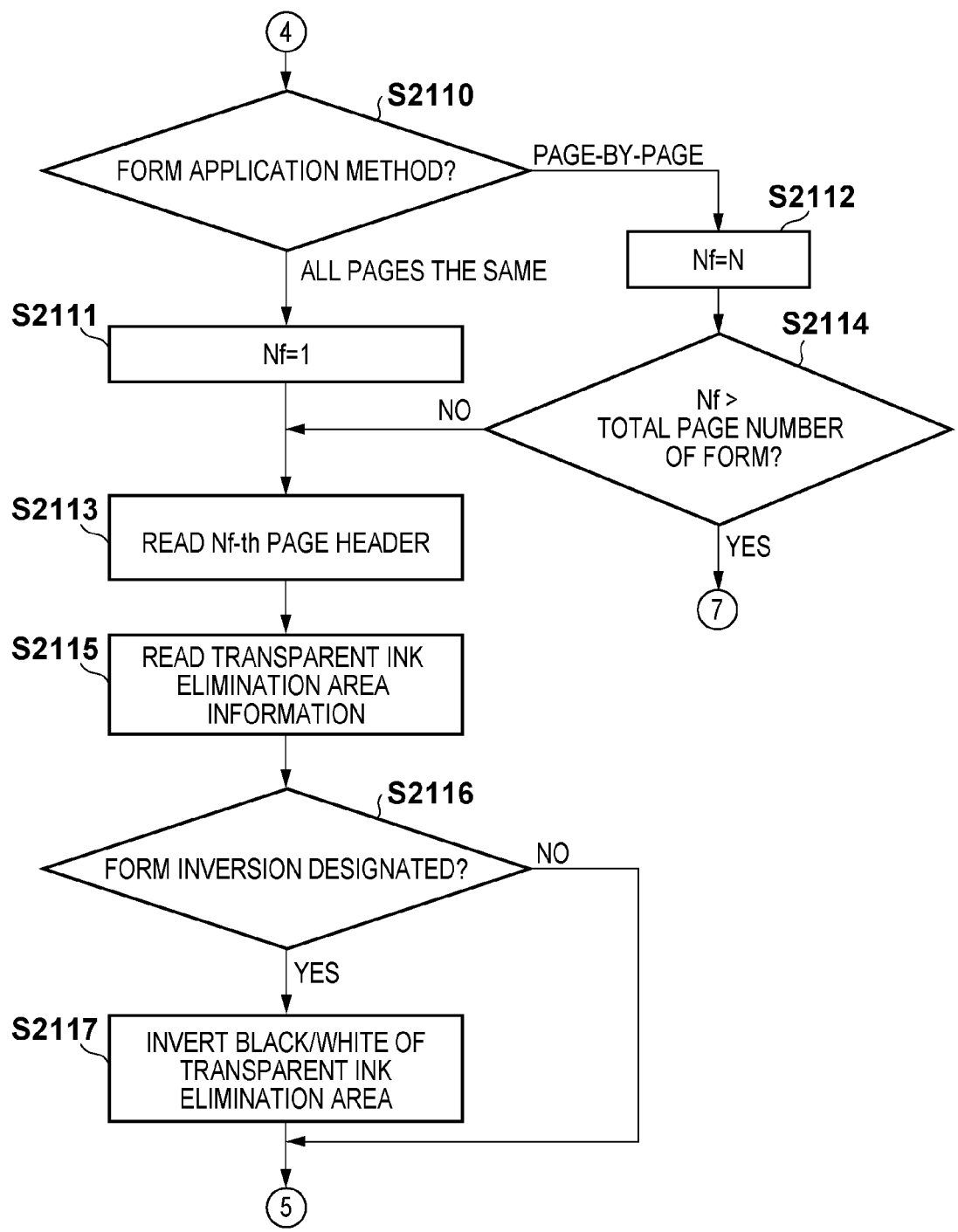
Figure 21C:
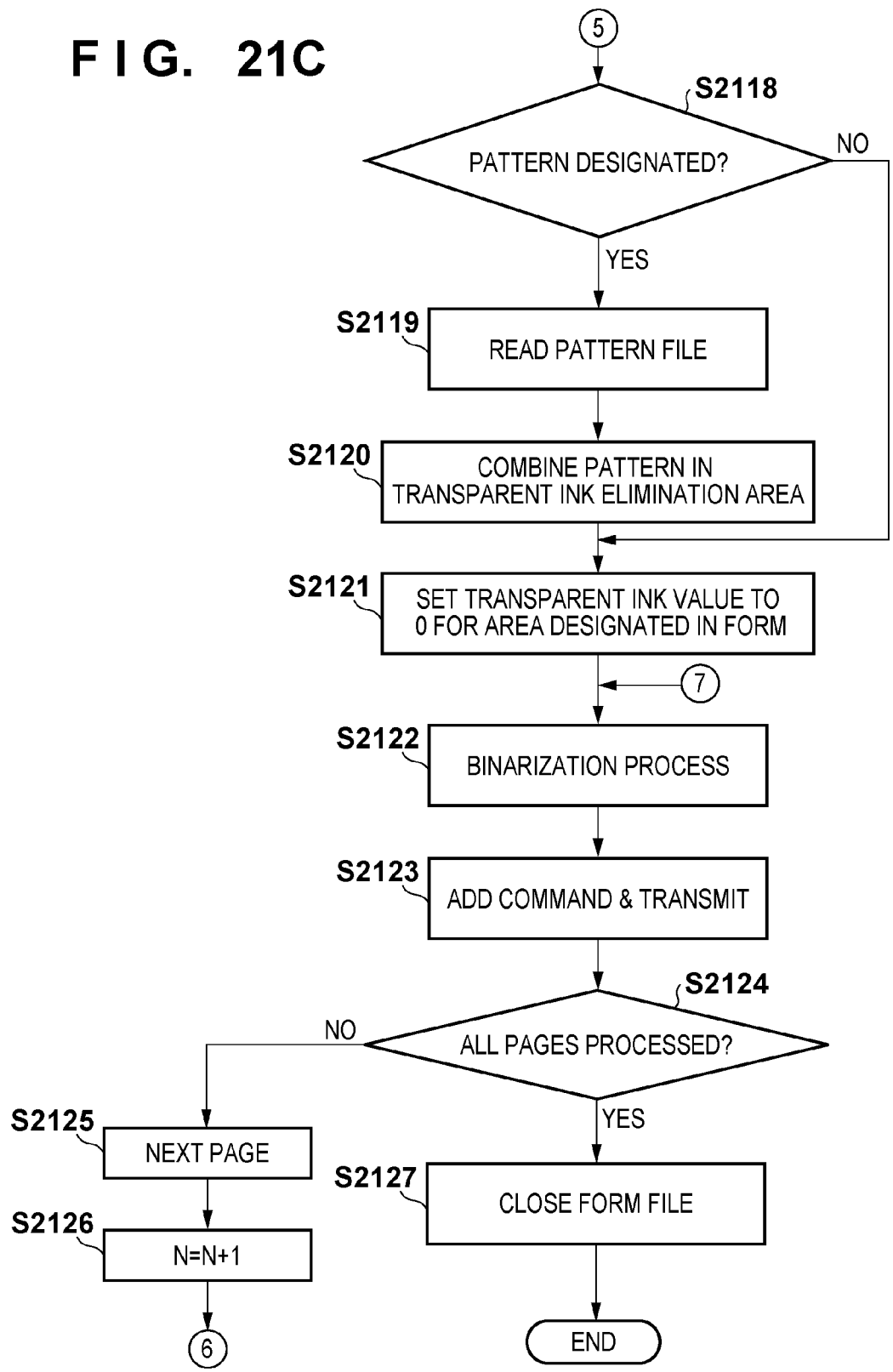

Next, the form combination process performed by the command generation module 225 at S1205 will be described in detail with reference to FIGS. 21A to 21C, in the case where printing is executed in the form combination printing mode, based on settings on the user interface.

Firstly, the command generation module 225 checks, with reference to the location and name of a form file to be used in the form combination printing stored in the print setting information, whether the form file exists (S2101). Here, in the case where the form file does not exist, the command generation module 225 notifies error information indicating that the form file does not exist to the status information display module 227 (S2102), and ends the processing. On the other hand, in the case where the form file does exist, the command generation module 225 opens the form file (S2103), and reads the job header 2001 stored at the start of the form file (S2104).

Next, the command generation module 225 initializes the number of processed pages N to 1 (S2105). The command generation module 225 then performs rasterization of the current page (S2106) and the first color conversion process 301 (S2107). These processes are the same as the processes of S1206 and S1207 in FIG. 12A. Next, the command generation module 225 performs the second color conversion process 302 (S2108). The second color conversion process 302 implemented here is the same as the second color conversion process 302 for use in the full-surface coating mode implemented at S1209 of FIG. 12A, with the second color conversion process 302 for use in the full-surface coating mode being performed by loading and using a LUT for the full-surface coating mode.

Accordingly, CMYKP 8-bit data is generated at the point at which S2108 ends, and P has a value within the overall print range. Thereafter, the command generation module 225 performs the output gamma process 303 (S2109). This processing is the same as the process of S1211 in FIG. 12B.

Next, the command generation module 225 checks the form application method with reference to the print setting information (S2110). In the case where all pages the same is selected as the form application method, 1 is substituted for Nf (S2111). On the other hand, in the case where page-by-page is selected as the form application method, N is substituted for Nf (S2112). The designated Nf-th page header is then read (S2113). Thus, in the case where all pages the same is selected as the form application method, the transparent ink elimination area of the first page is always used, and in the case where page-by-page is selected, the transparent ink elimination area of the same page as the page currently being processed is used.

Note that the form application process is skipped in the case where Nf is greater than the total number of pages at S2114 after the processing of S2112, because the Nf-th form will not exist. In such a case, the output result for subsequent pages will be the same as in the full-surface coating mode. Also, the total number of pages of the form can be found out from the total number of pages 2004, which is one of the elements of the job header 2001.

After the processing of S2113, transparent ink elimination area information indicated by the page data position 2011, which is one of the elements of the Nf-th page header 2005, is read from the RAM 14 (S2115). The command generation module 225 then checks whether form inversion is designated with reference to the print setting information (S2116). In the case where form inversion is designated, the values "1" and "0" in the transparent ink elimination area information read to the RAM 14 are inverted (S2117). The command generation module 225 similarly checks whether pattern application is designated with reference to the print setting information (S2118).

Patterns, like transparent ink elimination area information, are constituted by the binary values "0" and "1". The command generation module 225, in the case where pattern application is designated, reads the image of the pattern to be used in accordance with the designation to the RAM 14 (S2119). The pattern is then repeatedly combined with the transparent ink elimination area information read to the RAM 14 (S2120). This combining is performed by repeatedly calculating the OR of the pattern in relation to the transparent ink elimination area information.

The pattern is superimposed on areas having a "0" value (=areas in which transparent ink is not applied) in the transparent ink elimination area information. Executing these processes when form combination processing is executed enables the user to adjust and/or decorate transparent ink elimination areas, without having to again create a form file.

Next, transparent ink is eliminated in accordance with the transparent ink elimination areas read from transparent ink plane information after the output gamma process 303 (S2109) and edited as a result of the processing of S2115 to S2120 (S2121). Specifically, the command generation module 225 performs processing to set the pixel value of the transparent ink plane after the output gamma process 303 to 0, with regard to pixels in the transparent ink elimination areas whose value is "0". The transparent ink plane value after the output gamma process 303 remains unchanged, with respect to pixels in the transparent ink elimination areas whose value is "1" or areas in which transparent ink elimination areas do not exist.

Thereafter, the binarization process 304 (S2122) and processes to add and transmit commands (S2123) are performed. These processes are the same as the processes of S1212 and S1213 of FIG. 12B. Finally, the command generation module 225 determines at S2124 whether all of the pages have been processed, and if there are any remaining pages, proceeds to the next page (S2125, S2126). Thereafter, when there are no longer any remaining pages, the form file opened at S2103 is closed (S2127), and the processing is ended.

A typical user is thereby able to easily create form files using the user interface of a print driver with a consumer printer such as an inkjet printer and readily obtain an image exhibiting a high level of design sense using transparent ink.

FIG. 26 is a diagram schematically representing images obtained by the above-mentioned processing. An image resulting from full-surface coating is shown in FIG. 26B, in contrast to FIG. 26A with respect to which no transparent ink whatsoever has been applied, with transparent ink being applied to the shaded portions. On the other hand, an image obtained by designating and combining an image of the character "A" as a form file is shown in FIG. 26C. An image obtained by designating an image of the character "A" as a form file and further additionally combining a round design pattern therewith is shown in FIG. 26D.

Improved Usability of User Settings

Figure 23A:
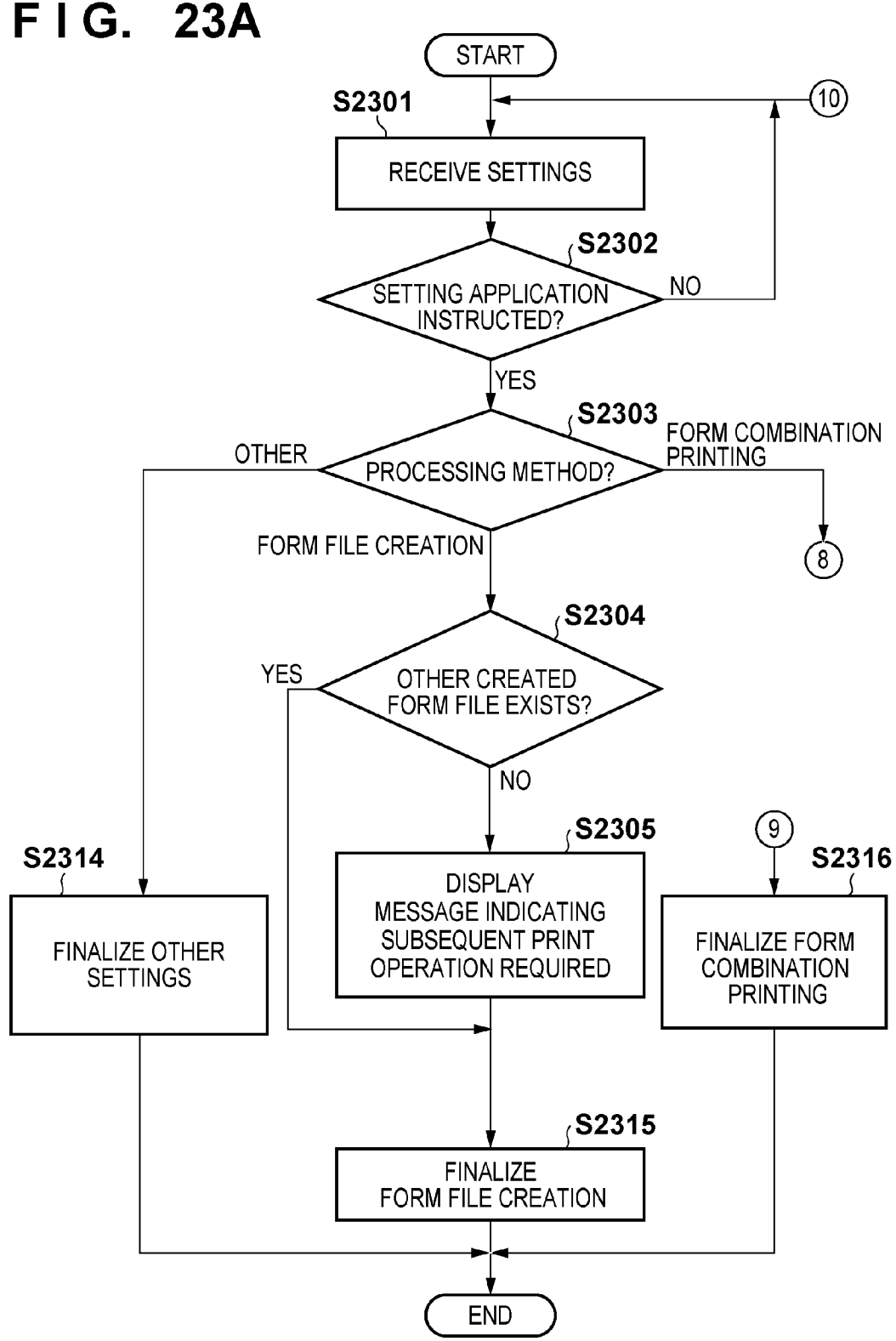
FIGS. 23A and 23B are flowcharts showing processing in a user setting mode.

Processing performed by the user interface module when form file creation or form combination printing is designated on the print settings screen displayed by the user interface module will be described using FIGS. 23A and 23B.

At S2301, print settings are received on the print settings screen displayed by the user interface module. Here, when print setting application is instructed at S2302 after the setting consistency process described with FIGS. 7 to 10 and the like has been performed, the processing proceeds to S2303, and the transparent ink coating method setting is judged. Here, in the case where a coating method other than the user setting mode is designated, the processing proceeds to S2314, and setting is finalized. On the other hand, in the case where the form creation mode of the user setting mode is designated, the processing proceeds to S2304, where it is determined whether any form files already exist apart from the form that is about to be created. This processing involves determining whether any other form files exist in the prescribed location for creating form files in the external storage device 15.

If the determination result indicates that another form that has been created does not exist, it is perceived that the user has not perform form file creation before, or in other words, that the user is not familiar with the procedure for creating a form file. In view of this, at S2305, a message conveying the fact that the print operation needs to be completed at the application is displayed following completion of operations at the print driver. This display control is executed as a function of the printer driver prior to operations being completed, and the control is subsequently delivered to the application, as a warning intended to ensure that the printing process is entirely completed. On the other hand, in the case where another form that has been created does exist, it is regarded that the user already knows the procedure for creating a form, and the abovementioned message display is not performed. At S2315, a completion instruction from the user involving the pressing of an OK button on the print settings screen is received, finalizing the form file creation settings and completing the setting operation using the printer driver. Thereafter, processing is continued in the application, and when a print instruction is given by the user via the print screen of the application, the job involving form file creation is executed, and the actual processing is performed.

Note that in the present embodiment, the warning display prompting the user to complete the print operation is performed in the case where no form files have been created. However, in order to prevent the user from forgetting to perform the operation, the warning display may also be performed in the case where a created form file does exist. In such a case, the user can also be allowed to select whether to perform this warning display when printing is subsequently performed.

Also, in the case where, at S2303, the designated transparent ink coating method is the form combination printing mode, the processing proceeds to S2306, and it is confirmed whether a form file required for combining is designated. Here, if a form file is designated, the processing proceeds to S2307, where the header information of the designated form file is read out, and it is judged whether layout-related settings such as page size, width, height and page data position match the print settings of the target original document that is about to be printed.

Figure 23B:
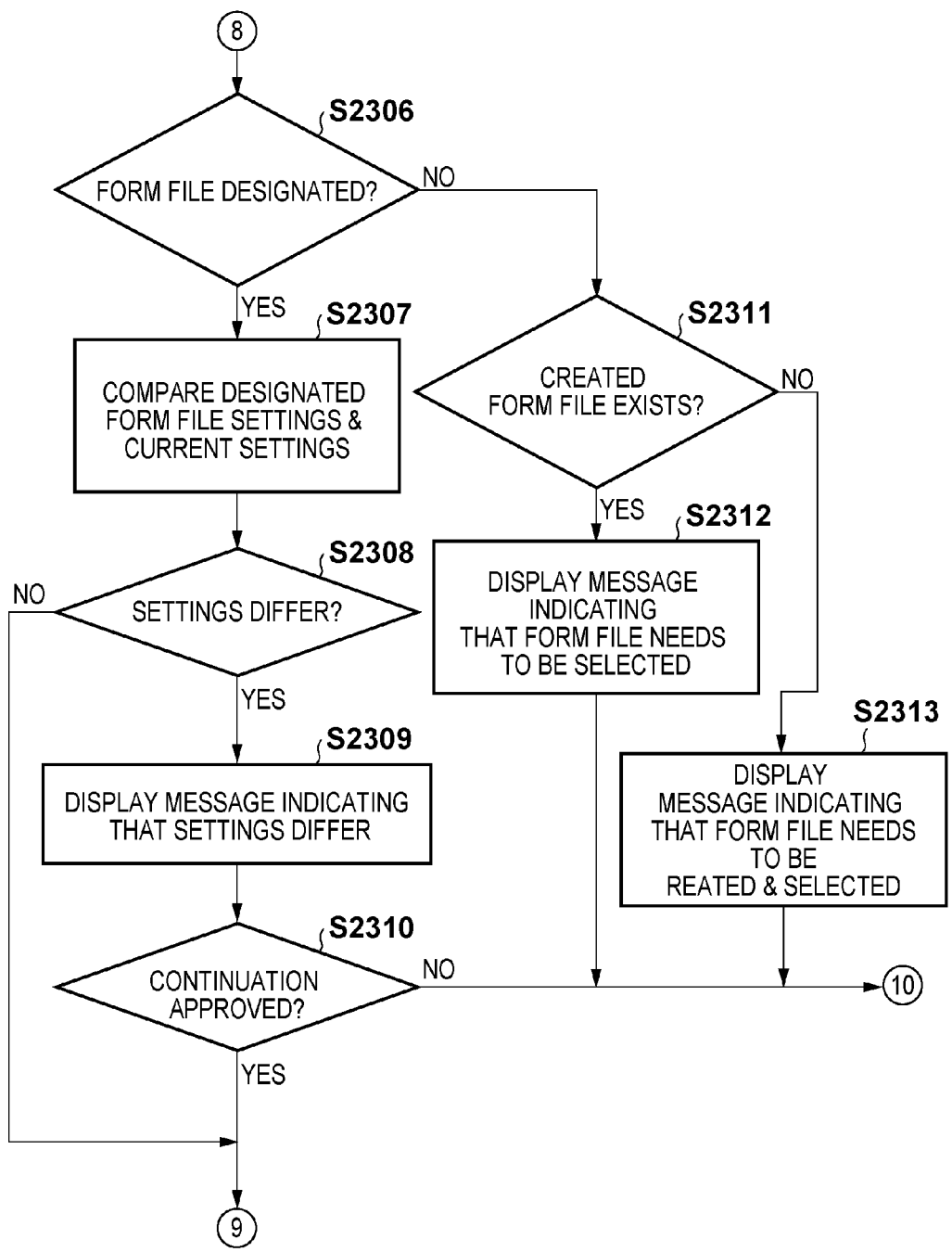

If the judgment result of S2307, according to FIG. 23B, indicates that these settings are the same ("No" in S2308), the processing proceeds to S2316. On the other hand, in the case where these settings are different ("Yes" in S2308), the processing proceeds to S2309, where a message indicating that it may not be possible to obtain the intended combination result since the layout-related settings are different is displayed. Then, at S2310, the user's response to this display is judged, and if continuation is approved, the processing proceeds to S2316. At S2316, the completion instruction by the user involving the pressing of an OK button on the print settings screen is received and the settings of the form combination printing are finalized, completing the setting operation by the printer driver. Thereafter, processing is continued in the application, and when a print instruction is given by the user via the print screen of the application, the job involving form combination printing is executed, and the actual processing is performed.

Also, in the case where, at S2310, continuation of processing is not approved, the processing returns again to S2301, and enters a state of receiving a change to the print settings. Also, in the case where a form file is not designated at S2306 despite the transparent ink coating method designated at the abovementioned S2303 being form creation, the processing proceeds to S2311, where it is firstly confirmed whether a form file that has been created exists.

Here, in the case where a form file that has been created does not exist, a message is displayed at S2313 prompting form file creation so that a selection is made, having regarded the user as not understanding the need to create a form file. On the other hand, in the case where it can be confirmed at S2311 that a form file that has been created exits, a message is displayed at S2312 conveying only the need to select a form file, assuming that the user is aware of the need to create a form file. After displaying the message at S2312 or S2313, the processing returns to S2301, and enters a state of receiving a change to the print settings.

The above configuration enables the fact that the same operation as normal printing needs to be performed when creating form data, and that form data needs to be created before performing form combination printing to be effectively signaled, without informing the user excessively.

Figure 24:
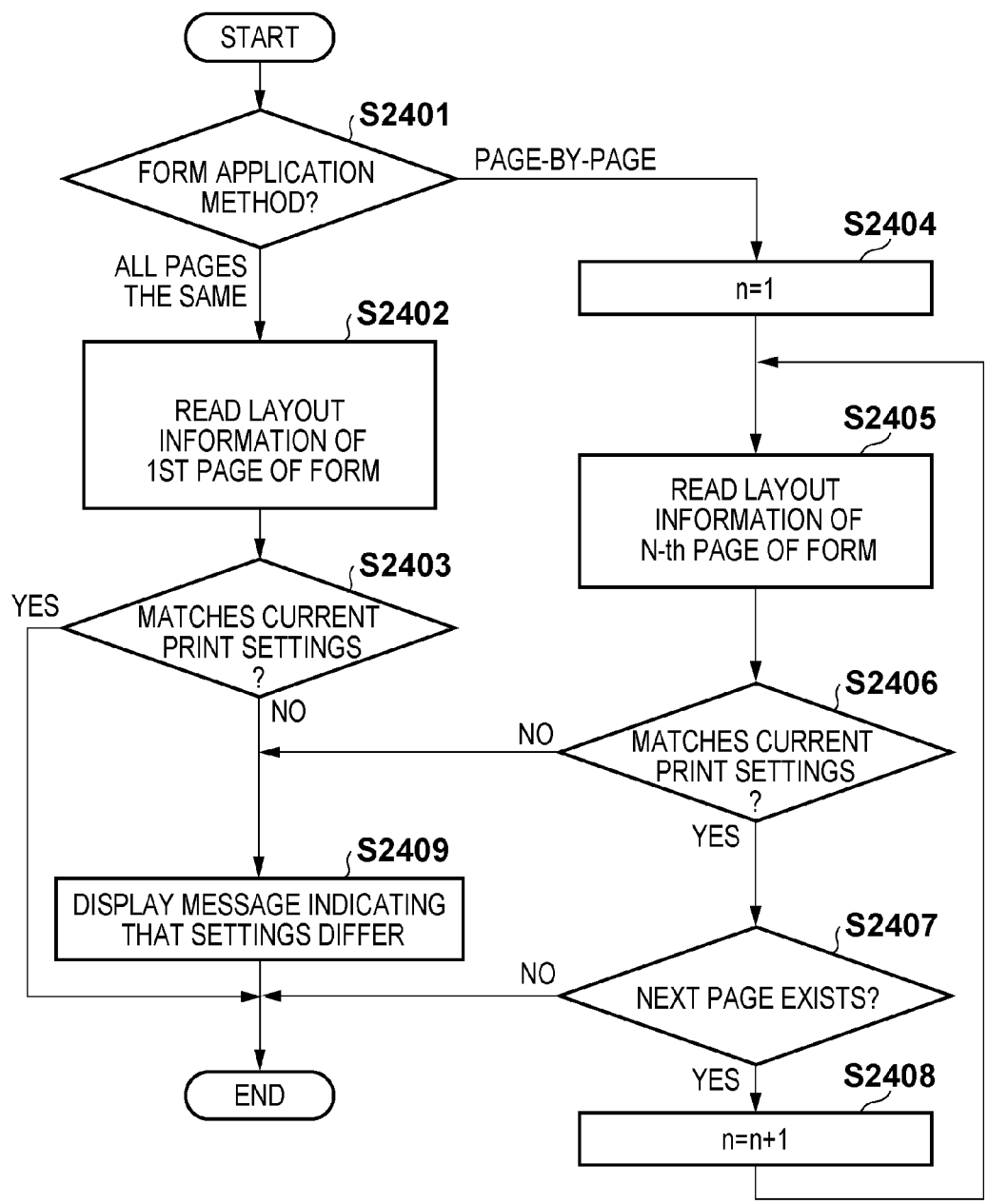
FIG. 24 is a flowchart showing a process of comparing a form file with the settings of a target original document.

Next, the process of comparing the settings of the form file and the target original document at S2307 will be described in detail using FIG. 24. The user interface module firstly discriminates at S2401 of FIG. 24 whether the form application method designated on the pull-down menu 1814 in FIG. 18B is all pages the same or page-by-page. If all page the same is designated here, the processing proceeds to S2402, where the layout settings of the first page of the form file are read out.

Next, these settings and the corresponding current print settings are compared at S2403, and if matched, the processing is directly ended. However, if not matched, the processing proceeds to S2409, where a message indicating that the settings differ is displayed. This message display processing is equivalent to the processing of S2309 in FIG. 23B.

Also, in the case where, at the abovementioned S2401, the form application method is page-by-page, the processing proceeds to S2404, where the layout settings are read out in order from the first page of the form at S2405 to S2408, and compared with the current print settings at S2406. Here, if a page whose settings differ is found, the processing proceeds to S2409, where a message equivalent to the processing of S2309 in FIG. 23B is displayed. On the other hand, in the case where, at S2407, is difference with the current settings is not found from the first to the last page of the form, the processing is directly ended. Note that in the case of the comparison of print settings performed by the user interface module, comparison cannot be performed with all of the pages of the target original document, since the print settings of the target original document are the only print settings received from the operating system.

In contrast, more accurate setting inconsistency detection is possible if a comparison process is performed with a page composition module or the like that is capable of prereading pages subsequent to the current page in a print job.

Figure 25:
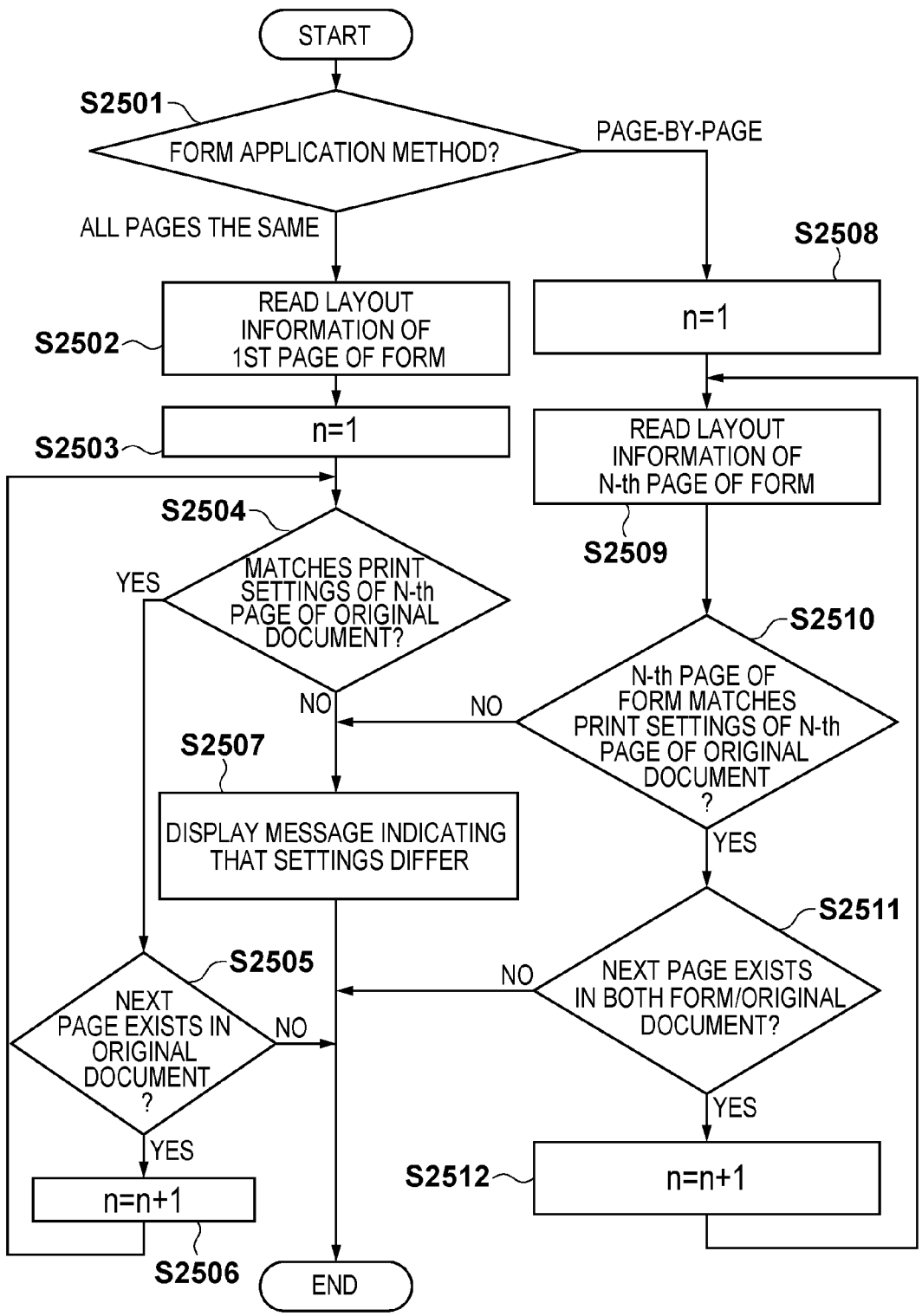
FIG. 25 is a flowchart showing a comparison process by a module capable of prereading pages.
Figure 26A:
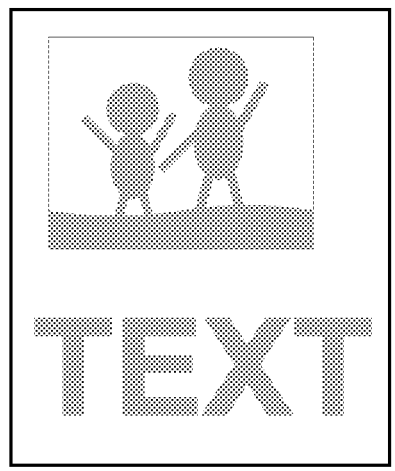
FIGS. 26A to 26D schematically represent images obtained in the user setting mode.
Figure 26B:
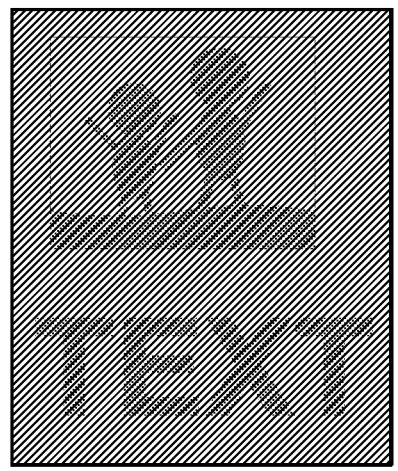
Figure 26C:
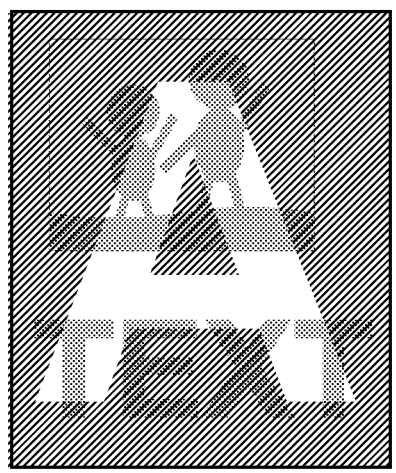
Figure 26D:
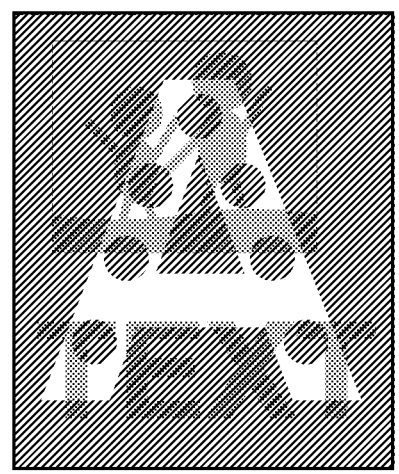

An example comparison process in the abovementioned embodiment that is performed by a module capable of prereading pages in a print job will be described using FIG. 25. At S2501, the module discriminates whether the form application method is all pages the same or page-by-page. If the discrimination result indicates all page the same, the processing proceeds to S2502, where the layout settings of the first page of the form file are read out. Next, at S2503 to S2506, the read settings and print settings of the targeted original document are compared in order from the first page. If mismatched pages are not found, the processing is directly ended, whereas if mismatched pages are found, the processing proceeds to S2507, where a message indicating that the settings differ is displayed.

In the case where, at the above-mentioned S2501, the form application method is page-by-page, the processing proceeds to S2508, and at S2509 to S2512 the layout settings of pages corresponding to the targeted original document are compared in order starting with the layout setting of the first page of the form. Here, if a pair of mismatched pages is not found, the processing is directly ended, whereas if a pair of mismatched pages is found, the processing proceeds to S2507, where a message indicating that the settings differ is displayed.

With this message display of S2507, if the module that performs the comparison process is the page composition module, a configuration in which that module notifies the message to the status information display module to be displayed thereby is conceivable. Also, if the module that performs the comparison process is a print preview module capable of exhaustively displaying the print settings of one job, a configuration in which preview module itself displays the message is conceivable.

Note that since the form file creation process is, as described above, performed by the command generation module through normal printing procedures, the form file will not necessarily be generated as soon as the print settings screen is closed and print execution is instructed, in the case where a print job has already been issued to the print queue.

Thus, in the case where only existing form files are detected and displayed when displaying a list, the user may possibly not be able to see the form whose creation he or she has instructed on the form file list screen shown FIG. 18A or 18B depending on the timing.

Accordingly, the user interface module confirms the existence of form files in the external storage device 15 at predetermined time intervals during display of FIG. 18A or 18B, and renews the display if there is a difference with the content of the displayed list.

According to the above configuration, in the case where the layout of the original document and the layout of the form file to be combined therewith are mismatched, the user can be informed of this fact before a job whose output result after the combining the form file could possibly not be as the user intended is actually output and paper is expended.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-195066, filed Aug. 31, 2010, which is hereby incorporated by reference herein in its entirety.

What is claimed is:

1. A print control apparatus having a control unit that executes a printer driver for providing a form combination printing function and an application for instructing data targeted for combining to the printer driver, comprising:
    a display unit, as a function of the printer driver, that displays a print settings screen for setting at least one of an instruction for form combination printing and an instruction for creation of form data;
    a storage unit that stores, as a form file, in a storage device, created form data whose creation was instructed on the print settings screen; and
    a determination unit that, in a case where the instruction for creation of form data is selected using the print settings screen, determines whether any form file is not stored in the storage device yet;
    wherein in a case where the instruction for creation of form data is selected using the print settings screen, if the determination unit determines that any form file is stored, the display unit does not display a message screen showing a message indicating that an instruction to complete an operation is required on a print screen provided by the application, in order to execute creation of form data instructed using the print settings screen, and if the determination unit determines that any form file is not stored yet, the display unit further displays the message screen,
    wherein the storage unit stores, as a form file, in a storage device, form data created by a creation instruction given on the print settings screen, after the instruction to complete the operation was given on the print screen provided by the application,
    wherein the display unit displays a form file list screen showing form files stored in the storage device, in a case where an instruction for form combination printing is received via the print settings screen,
    at least one of paper size, borderless printing, amount of expansion, paper orientation, binding margin width, multi-page printing, reduction/enlargement, double-sided printing, and binding direction for double-sided printing is shown as a form file setting on the form file list screen, and
    wherein the display unit displays a screen showing a warning, in a case where there is an inconsistency between a setting of a form file selected from the form file list screen and a print setting configured using the print settings screen, when an instruction for the form combination printing has been given.

2. The apparatus according to claim 1,
    wherein the display unit displays a screen showing a message prompting selection of a form file, in a case where a form file has not been selected when an instruction for the form combination printing has been given.

3. The apparatus according to claim 1,
    wherein the display unit displays a screen showing a message prompting creation of a form file, in a case where a form file is not stored in the storage device when an instruction for the form combination printing has been given.

4. The apparatus according to claim 1,
    wherein printing that uses data obtained by combining form data of a form file stored in the storage device and data of a pattern image held in advance by the printing apparatus can be instructed on the print settings screen.

5. The apparatus according to claim 1,
    wherein an area for applying a color material, including transparent ink, for decorating printed material is determined using the form data of the form file.

6. A control method of a print control apparatus that is provided with a storage apparatus for storing form data and on which operates an application for instructing data targeted for combining with the form data when form combination printing is performed, comprising:
    a display control step of displaying, as a function of a printer driver for providing a form combination printing function, a print settings screen for setting at least one of an instruction for form combination printing and an instruction for creation of form data, and
    a determination step of, in a case where the instruction for creation of form data is selected using the print settings screen, determining whether any form file is not stored in the storage apparatus yet;
    wherein in a case where the instruction for creation of form data is selected using the print settings screen, if it is determined in the determination step that any form file is stored, in the display control step, a message screen is further displayed showing a message indicating that an instruction to complete an operation is required on a print screen provided by the application, in order to execute creation of form data instructed using the print settings screen, and if it is determined in the determination step that any form file is not stored yet, in the display control step, the message screen is further displayed, wherein form data created by a creation instruction given on the print settings screen is stored in the storage apparatus as a form file, after the instruction to complete the operation was given on the print screen provided by the application, wherein the display control step displays a form file list screen showing form files stored in the storage apparatus, in a case where an instruction for form combination printing is received via the print settings screen, at least one of paper size, borderless printing, amount of expansion, paper orientation, binding margin width, multi-page printing, reduction/enlargement, double-sided printing, and binding direction for double-sided printing is shown as a form file setting on the form file list screen, and wherein the display control step displays a screen showing a warning, in a case where there is an inconsistency between a setting of a form file selected from the form file list screen and a print setting configured using the print settings screen, when an instruction for the form combination printing has been given.

7. The method according to claim 6, wherein in the display control step a form file list screen showing form files stored in the storage apparatus is displayed, in a case where an instruction for form combination printing is received via the print settings screen, and at least one of paper size, borderless printing, amount of expansion, paper orientation, binding margin width, multi-page printing, reduction/enlargement, double-sided printing, and binding direction for double-sided printing is shown as a form file setting on the form file list screen.

8. The method according to claim 7, wherein, in the display control step a screen showing a warning is displayed, in a case where there is an inconsistency between a setting of a form file selected from the form file list screen and a print setting configured using the print settings screen, when an instruction for the form combination printing has been given.

9. The method according to claim 6, wherein, in the display control step, a screen showing a message prompting selection of a form file is displayed, in a case where a form file has not been selected when an instruction for the form combination printing has been given.

10. The method according to claim 6, wherein, in the display control step, a screen showing a message prompting creation of a form file is displayed, in a case where a form file is not stored in the storage apparatus when an instruction for the form combination printing has been given.

11. The method according to claim 6, wherein printing that uses data obtained by combining form data of a form file stored in the storage apparatus and data of a pattern image held in advance by the printing apparatus can be instructed on the print settings screen.

12. A non-transitory computer-readable recording medium having recorded thereon a printer driver for causing a computer to execute the control method, wherein the computer is provided with a storage apparatus for storing form data and on which operates an application for instructing data targeted for combining with the form data when form combination printing is performed, wherein the control method comprises:

a display control step of displaying, as a function of a printer driver for providing a form combination printing function, a print settings screen for setting at least one of an instruction for form combination printing and an instruction for creation of form data, and a determination step of, in a case where the instruction for creation of form data is selected using the print settings screen, determining whether any form file is not stored in the storage apparatus yet;

wherein in a case where the instruction for creation of form data is selected using the print settings screen, if it is determined in the determination step that any form file is stored, in the display control step, a message screen is further displayed showing a message indicating that an instruction to complete an operation is required on a print screen provided by the application, in order to execute creation of form data instructed using the print settings screen, and if it is determined in the determination step that any form file is not stored yet, in the display control step, the message screen is further displayed, wherein form data created by a creation instruction given on the print settings screen is stored in the storage apparatus as a form file, after the instruction to complete the operation was given on the print screen provided by the application, wherein the display control step displays a form file list screen showing form files stored in the storage apparatus, in a case where an instruction for form combination printing is received via the print settings screen, at least one of paper size, borderless printing, amount of expansion, paper orientation, binding margin width, multi-page printing, reduction/enlargement, double-sided printing, and binding direction for double-sided printing is shown as a form file setting on the form file list screen, and wherein the display control step displays a screen showing a warning, in a case where there is an inconsistency between a setting of a form file selected from the form file list screen and a print setting configured using the print settings screen, when an instruction for the form combination printing has been given.

* * * * *